US009205912B2

(12) United States Patent
Clark

(10) Patent No.: US 9,205,912 B2
(45) Date of Patent: Dec. 8, 2015

(54) COMPOUND MOTION STRUCTURE

(76) Inventor: John McMurray Clark, Eltham (AU)

(*) Notice: Subject to any disclaimer, the term of this patent is extended or adjusted under 35 U.S.C. 154(b) by 681 days.

(21) Appl. No.: 13/508,028

(22) PCT Filed: Nov. 4, 2010

(86) PCT No.: PCT/AU2010/001473
§ 371 (c)(1),
(2), (4) Date: May 3, 2012

(87) PCT Pub. No.: WO2011/054047
PCT Pub. Date: May 12, 2011

(65) Prior Publication Data
US 2012/0224964 A1    Sep. 6, 2012

Related U.S. Application Data

(60) Provisional application No. 61/257,993, filed on Nov. 4, 2009, provisional application No. 61/401,403, filed on Aug. 12, 2010.

(51) Int. Cl.
*B64C 9/14* (2006.01)
*B64C 3/50* (2006.01)
*B64C 9/04* (2006.01)
*B64C 9/16* (2006.01)
*B64C 9/02* (2006.01)

(52) U.S. Cl.
CPC ... *B64C 9/16* (2013.01); *B64C 9/02* (2013.01); *Y02T 50/44* (2013.01); *Y10T 74/18856* (2015.01)

(58) Field of Classification Search
CPC ............ B64C 9/02; B64C 9/16; Y02T 50/44; Y10T 74/18856
See application file for complete search history.

(56) References Cited

U.S. PATENT DOCUMENTS

| | | | | |
|---|---|---|---|---|
| 4,180,222 A | * | 12/1979 | Thornburg | 244/225 |
| 4,405,105 A | | 9/1983 | Dilmaghani et al. | |
| 5,230,487 A | * | 7/1993 | Gartelmann et al. | 244/216 |
| 6,010,097 A | | 1/2000 | Cox | |
| 6,467,733 B1 | * | 10/2002 | Young et al. | 244/215 |
| 6,481,667 B1 | * | 11/2002 | Ho | 244/99.11 |
| 7,063,292 B2 | | 6/2006 | Perez-Sanchez | |
| 7,484,694 B2 | | 2/2009 | Perez-Sanchez | |
| 8,104,710 B2 | * | 1/2012 | Harvey et al. | 244/99.2 |

* cited by examiner

*Primary Examiner* — Igor Kershteyn
(74) *Attorney, Agent, or Firm* — Birch, Stewart, Kolasch & Birch, LLP

(57) ABSTRACT

A compound motion structure (3) for connection between two surfaces comprising a first arm (5) and a second arm (7) swingable coupled together through a first hinge connection (13), a first surface (35) coupled to an opposite end of the first arm via a second hinge connection, a second surface (39) coupled to an opposite end of the second arm via a third hinge connection, the first arm (5) and the second arm (7) being movable thereby resulting in a compound motion of one or both surfaces.

6 Claims, 19 Drawing Sheets

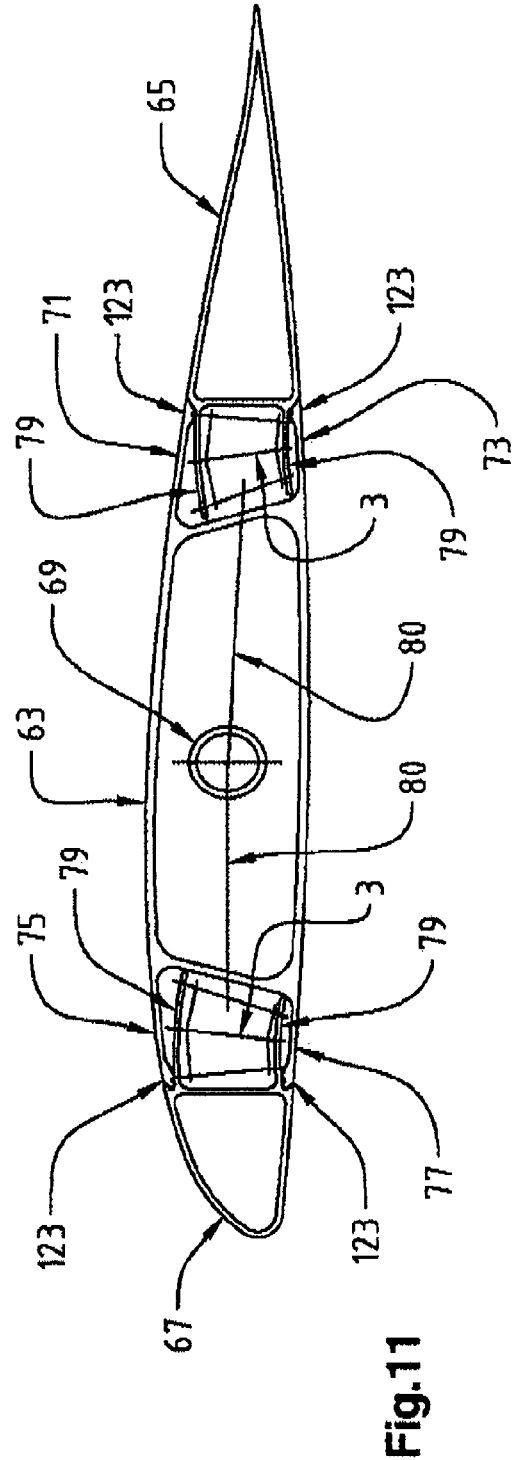
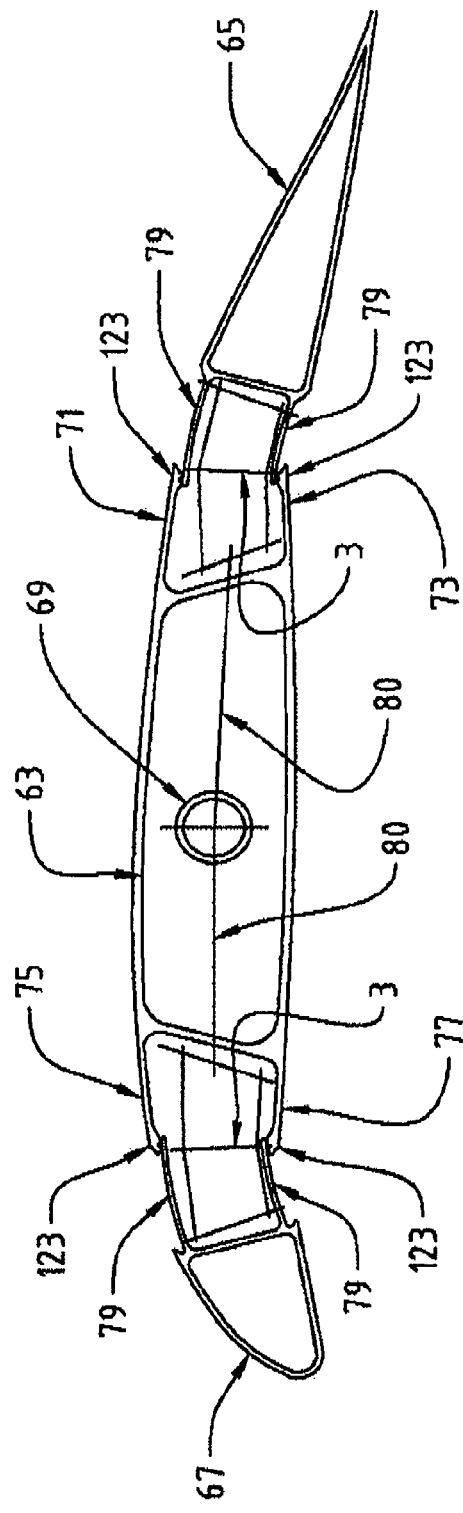
Fig.11
Fig.12

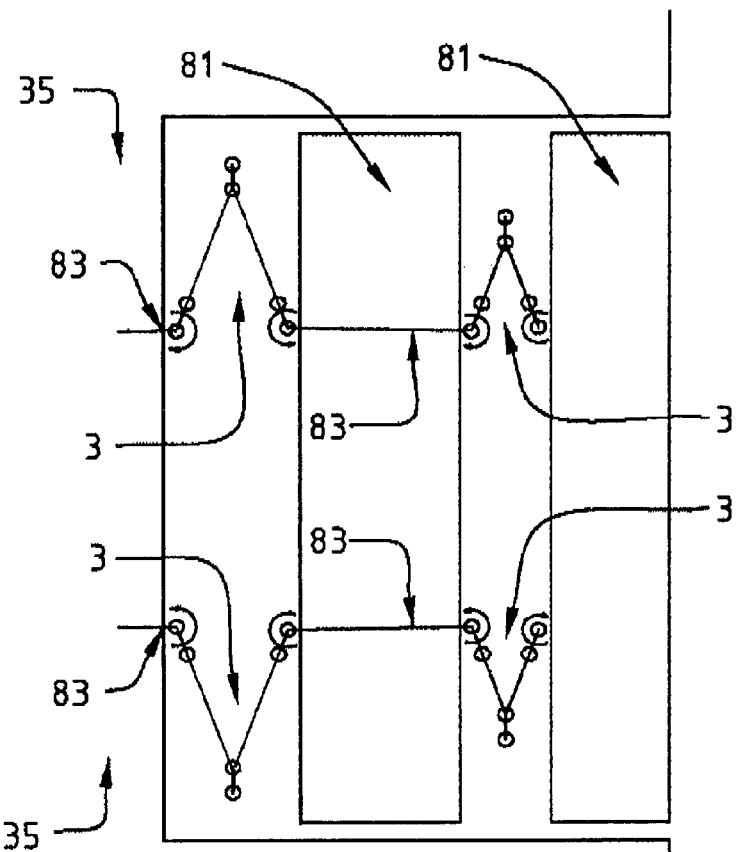
Fig.13
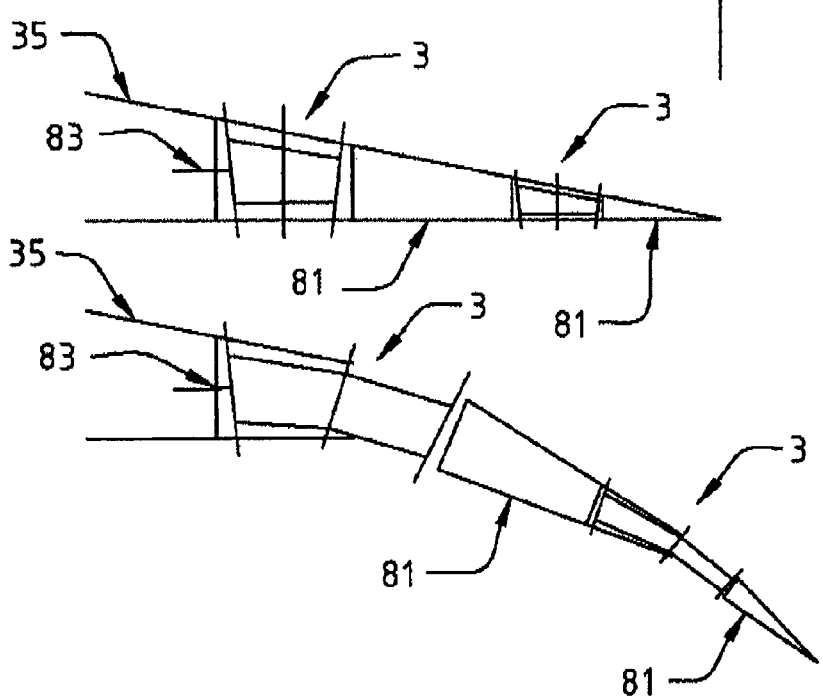
Fig.14
Fig.15

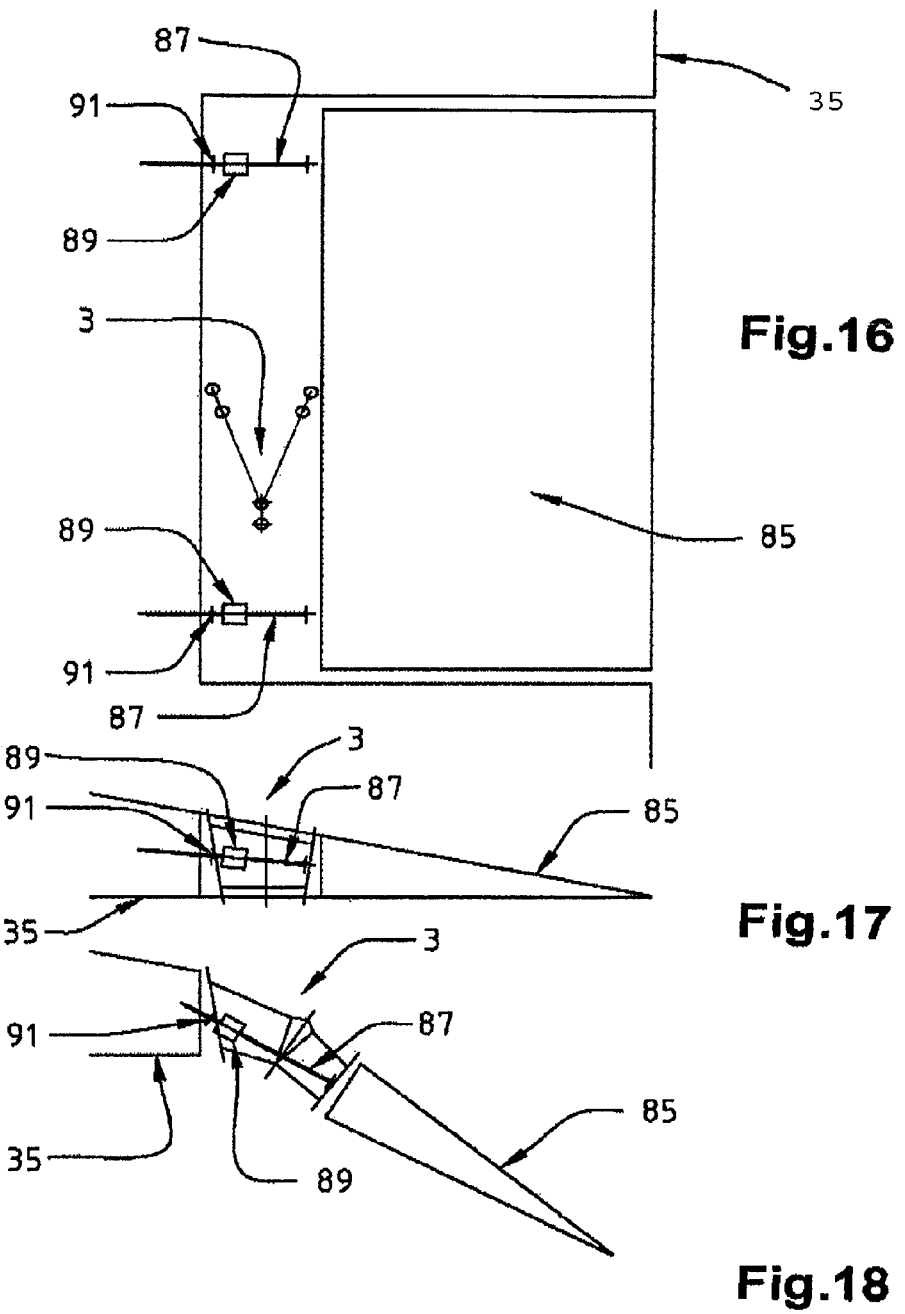

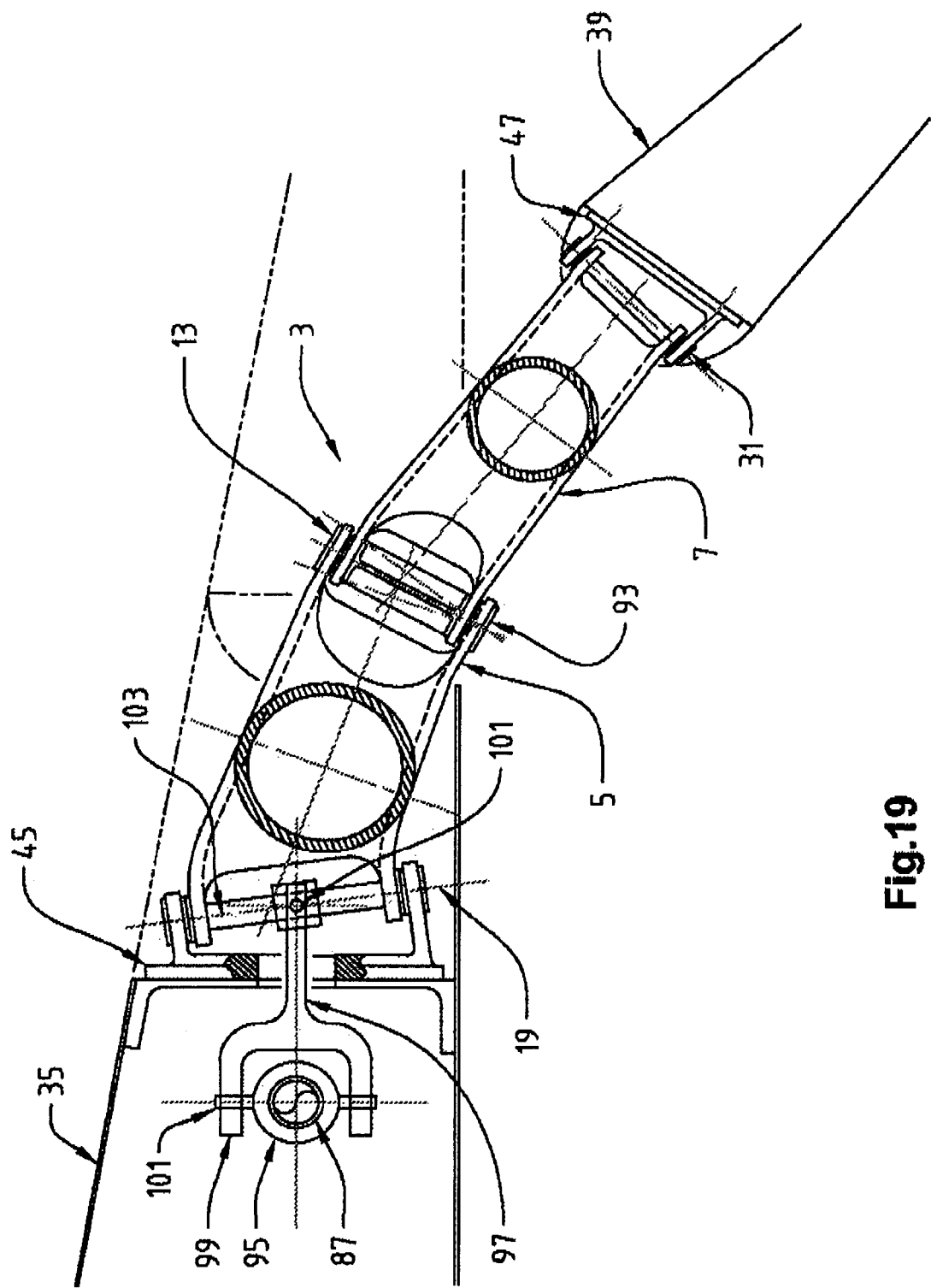

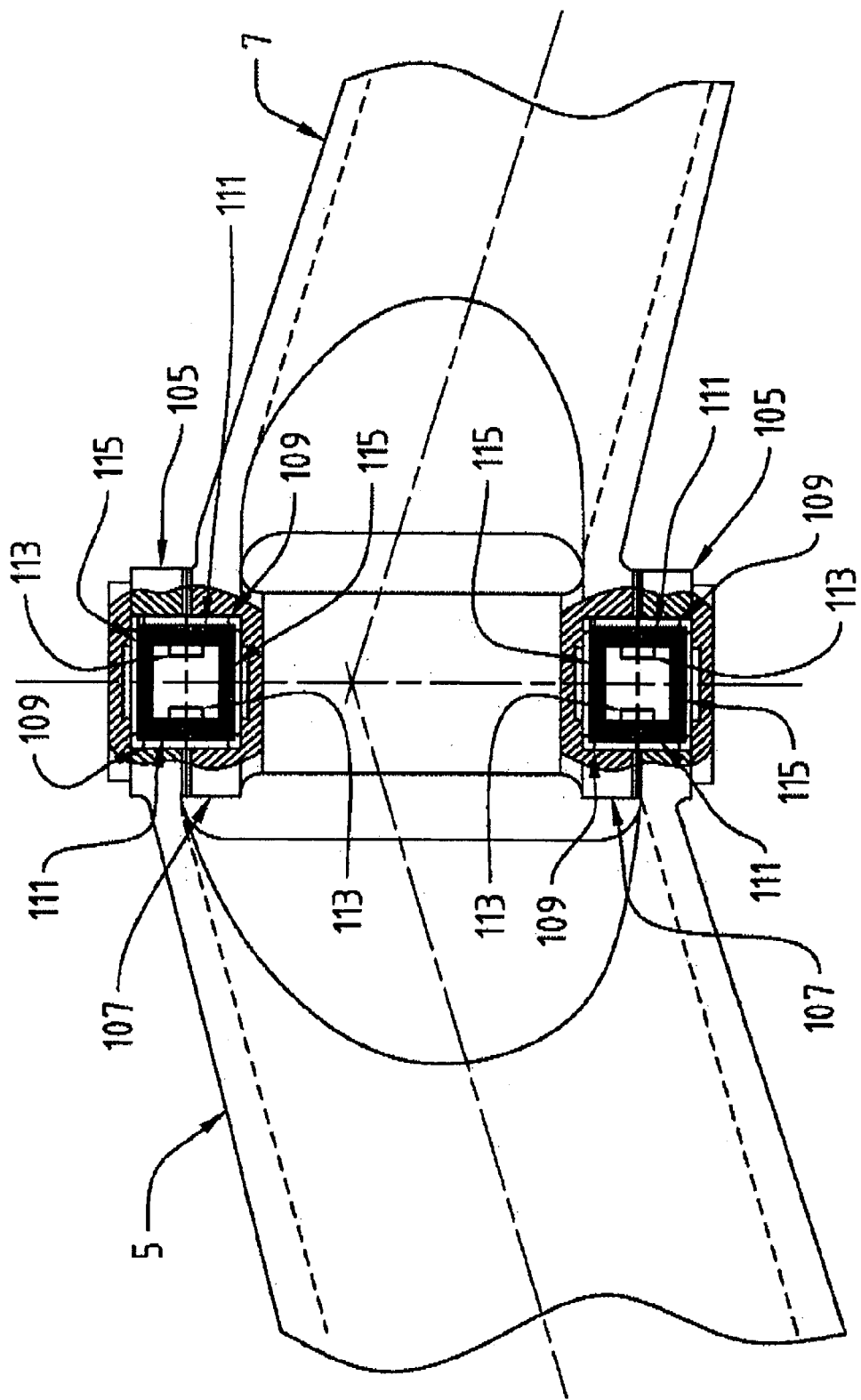

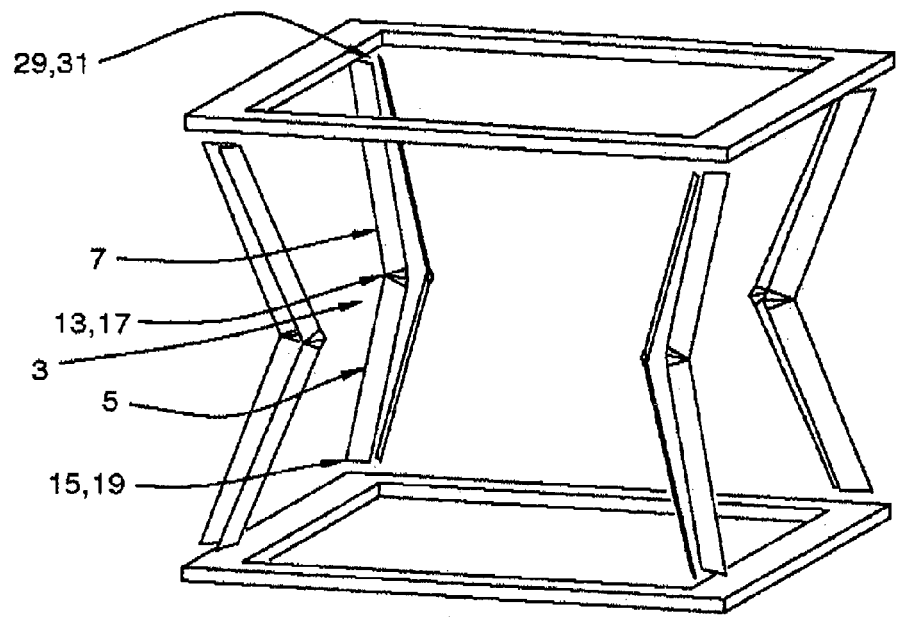
EXTENDED
Item Numbers Are Typical
For All 8 Assemblies
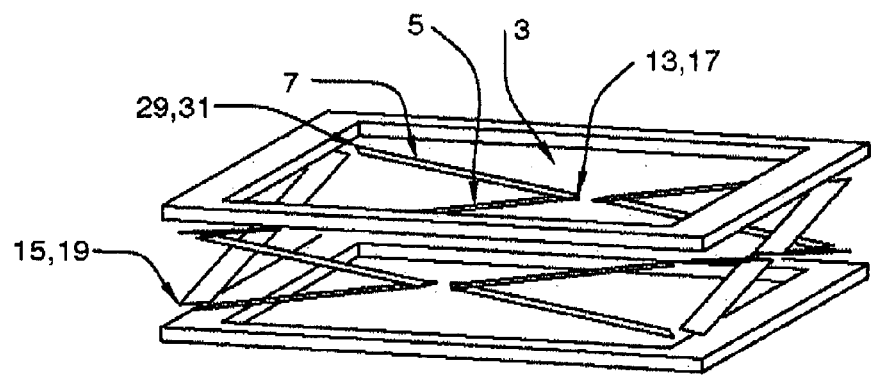
RETRACTED
Fig.23

COMPOUND MOTION STRUCTURE

This application is the National Stage under 35 U.S.C. §371 of International Application Number PCT/AU2010/001473 filed on Nov. 4, 2010, which claims priority under 35 U.S.C. §119(e) of Application Number 61/257,993 filed in the United States on Nov. 4, 2009 and Application Number 61/401,403 filed in the United States on Aug. 12, 2010.

BACKGROUND OF THE INVENTION

1. Field of Invention

This invention relates to a compound motion inducing and supporting structure. The invention can apply to all fields where two surfaces are required to be relatively supported, and to have compound relative motion induced therebetween. The invention relates in one embodiment to such for use in aircraft to deploy wing flaps (high lift devices). Embodiments of the invention of may also be suitable for aircraft simulators, solar arrays, robotics and similar applications.

2. Description of Prior Art

In the aircraft arts, wing flaps such as Fowler flaps are deployed by employing complicated systems. Typically, such systems have bulky supporting mechanisms that support the flaps so that when activated by motors such as electric or hydraulic motors or by other means such as cables, the flaps can be extended and/or retracted. Generally known mechanisms occupy more physical height space than the height profile space of the main wing. Accordingly, in these cases a part of the support mechanism extends below the wing. This, in turn, requires that fairings be provided over that part of the support mechanism to improve the aerodynamic performance of the aircraft. It is known that failings contribute significantly to parasitic drag even if efficiently designed.

It should be realised that parasitic drag caused by fairings also contributes significantly to an increase in greenhouse emissions as the aircraft engines need to use additional power to overcome the drag problems that would otherwise be needed during normal cruising if there were no drag caused by failings. Generally, this also means that the aircraft must carry a higher fuel cargo than if the parasitic drag caused by failings could be avoided. Thus, riot only does extra fuel need to be provided to overcome the parasitic drag but extra fuel is also needed to, in turn, enable propulsion of the aircraft with the additional fuel load needed to be carried to overcome this parasitic drag. Consequently greenhouse gas emissions and carbon emissions are higher than if the parasitic drag were absent.

There are a multitude of prior patents directed to supporting structures for aircraft flaps. Some examples are shown in the following patent specifications:

i. WO/1998/023483 to Carlos Paez, entitled "MECHANISM FOR STREAMWISE FOWLER FLAP DEPLOYMENT" published on Jun. 4, 1998;
  ii. WO/1984/001343 to Franklin Gerald, entitled "FOLDING TRUSS MECHANISM FOR TRAILING EDGE FLAPS" published on Apr. 12, 1994;
  iii. WO/2008/051286 to Fox et al., entitled "LINK MECHANISMS FOR GAPPED RIGID KRUEGER FLAPS, AND ASSOCIATED SYSTEMS AND METHODS" published on May 2, 2008;
  iv. U.S. Pat. No. 2,836,380 to Raymond E. Pearson entitled "AIRPLANE WING WITH SLOTTED FLAP, COVE LIP DOOR, AND SPOILER" issued on May 27, 1958; and
  v. EP 0230061(B1) to Martin Stepheneon entitled "TRAILING EDGE FLAPS" published on Jul. 29, 1987.

Of the above, WO/1998/023483 shows a Fowler flap deployment system which does not protrude unduly from the height profile of the wing. EP 0230061(B1) shows a similar system that does not protrude unduly from the height profile of the wing. However, in bath these cases complicated mechanisms are required which, in turn, are expensive to manufacture, install, and service.

Helicopter rotor blades have traditionally been farmed from an aerofoil blade that has a particular profile. It is known that the profile is not ideal for all conditions of operation of a helicopter and that it would be desirable in some instances to be able to morph the blade profile for the required operating environment. In particular, it is known that as helicopters take off and land, the blades are moving in disturbed air created by the helicopter blades themselves. This is because of the resultant reflected air flow horn the landing surfaces. This is contrasted to the situation where the helicopter is in free flight, and the air penetrated by the helicopter blades is generally undisturbed by any reflected air. Thus, increased power is required for the motors to drive the rotor blades to accommodate for the reduced lift during take off and landing procedures which is known as transitional flight. It would be desirable to morph the profile of the helicopter blades during operation of the helicopter to provide increased lift without requiring increased fuel and power consumption by the motor of the helicopter.

Accordingly, there is a need for an improved supporting structure for aircraft wing flaps that can be contained within the confines of the height profile of the wing so as to avoid the need to provide failings.

In non aircraft environments it is also desirable to move two surfaces relative to each other with a compound motion and to provide support for the two surfaces by using a structure that is compact and simple to use, manufacture, install and service.

SUMMARY OF THE INVENTION

According to one embodiment of the invention, there is provided a compound motion structure for connection between two surfaces operable to have relative motion therebetween wherein when moved to an extended swing condition there is compound motion swinging of a second surface relative to a first surface. In some embodiments, the swing axes of a first hinge connection and a second hinge connection share a common plane intersecting therewith at all swing conditions.

According to an embodiment of the invention there is provided a compound motion inducing and supporting structure for connection between two surfaces required to be relatively supported, and to have compound relative motion induced therebetween, the structure comprising an arm assembly comprising a first swing arm and a second swing arm, the first swing arm and the second swing arm being swingably connected with each other at respective one ends by a first hinge connection located therebetween, and wherein a second hinge connection is provided at the opposite end of the first swing arm for connection with a first surface, and wherein a fluid lunge connection is provided at the opposite end of the second swing arm for connection with a second surface, the arm assembly being such that a swing axis of the third hinge connection is inclined in a minor image arrangement relative to a swing axis of the second hinge connection, and at a compound angle with respect to a swing axis of the first hinge connection, the first swing arm and the second swing arm being movable to cause swinging about all swing axes to a retracted or an extended swing condition where the first swing arm and the second swing arm are respectively retracted or extended relative to each other and wherein when moved to an extended swing condition from a retracted swing condition there will be compound motion swinging of the second surface relative to the first surface and the swing axes of the second hinge connection and the third hinge connection trace a path where there will be a common plane intersecting therewith at all swing conditions.

According to another embodiment, there is provided an aerofoil wherein the swing axes of a first hinge connection and a second hinge connection trace a path where there will be a common plane intersecting therewith at all angles of movement.

In another embodiment, there is provided an aerofoil comprising a compound motion structure and comprising a first position and a retracted condition wherein in the retracted condition said structure is contained within the profile of the aerofoil.

According to another embodiment of the invention there is provided an aerofoil comprising a main aerofoil and an auxiliary aerofoil and where the auxiliary aerofoil can be extended and retracted relative to the main aerofoil to change aerodynamic characteristics of the aerofoil, a compound motion inducing and supporting structure for connection between the main aerofoil and the auxiliary aerofoil to permit support and extension and retraction therebetween, the structure comprising an arm assembly comprising a first swing arm and a second swing arm, the first swing arm and the second swing arm being swingable connected with each other at respective one ends by a first hinge connection located therebetween, and wherein a second hinge connection is provided at the opposite end of the first swing arm and connected with the main aerofoil, and wherein a third hinge connection is provided at the opposite end of the second swing arm and connected with the auxiliary aerofoil, the structure being such that a swing axis of the third hinge connection is inclined in a minor image arrangement relative to a swing axis of the second hinge connection, and at a compound angle with respect to a swing axis of the first hinge connection, the first swing arm and the second swing arm of the structure being movable the to cause swinging about all swing axes and a compound motion to be imparted to the auxiliary aerofoil to cause a movement to a retracted or extended condition, and wherein in the redacted condition the structure is contained with the profile of the aerofoil and wherein the swing axes of the second hinge connection and the third hinge connection trace a path where there will be a common plane intersecting therewith at all angles of movement.

According to another embodiment of the invention there is provided a compound motion inducing and supporting structure connected between two surfaces required to be relatively supported and to have compound relative motion induced therebetween, the structure comprising at least two arm assemblies, each arm assembly comprising a first swing arm and a second swing arm, the first swing arm and the second swing arm being swingably connected with each other at respective one ends by a first hinge connection located therebetween, and wherein a second hinge connection is provided at the opposite end of the first swing arm for connection with a first surface, and wherein a third hinge connection is provided at the opposite end of the second swing arm for connection with a second surface, and wherein swing axes of the second hinge connection and third hinge connection are inclined relative to the first hinge connection, each of the at least two arm assemblies being mounted to the first surface and the second surface in spaced apart relationship, the first swing arm and the second swing arm being mounted to permit swinging about all axis to a retracted swing condition where the opposite ends of the first swing arm and second swing arm assembly are relatively closest to each other or to an extended swing condition wherein the opposite ends of the first swing arm of each arm assembly and second swing arm are relatively further away from each other and wherein when moved to the extended swing condition from the retracted swing condition there will be compound motion swinging of the second surface relative to the first surface and the swing axes of the second hinge connection and third hinge connection trace a path where there will be a common plane intersecting therewith at all swing conditions.

According to another embodiment of the invention there is provided an aerofoil comprising a main aerofoil and an auxiliary aerofoil and where the auxiliary aerofoil can be extended and retracted relative to the main aerofoil to change aerodynamic characteristics of the aerofoil, a compound motion inducing and supporting structure connected between the main aerofoil and the auxiliary aerofoil to permit support and extension and retraction therebetween, the structure comprising at least two arm assemblies each assembly comprising a first swing arm and a second swing arm, the first swing arm and the second swing arm being swingable connected with each other at respective one ends by a first hinge connection located therebetween, and wherein a second hinge connection is provided at the opposite end of the first swing arm and connected with the main aerofoil, and wherein a third hinge connection is provided at the apposite end of the second swing arm and connected with the auxiliary aerofoil, and wherein swing axes of the second hinge connection and third hinge connection are inclined relative to the first hinge connection, each of at least two arm assemblies being mounted to the respective main aerofoil and auxiliary aerofoil in spaced apart relationship, the first swing arm and the second swing arm being mounted to permit swinging about all swing axes and a compound motion to be imparted to the auxiliary aerofoil to cause swing movement of the arms to an extended or a retracted condition, and so the swing axis of the second hinge connection and the thud hinge connection of each arm assembly trace a path where there will be a respective common plane intersecting therewith at all swing movement positions, and wherein in the retracted condition the structure is contained within the profile of the aerofoil.

According to another embodiment of the invention, there is provided an apparatus comprising a first arm and a second arm swingably coupled together, a first surface coupled to an opposite end of the first arm and a second surface coupled to an opposite end of the second arm and the first arm and the second arm being movable thereby resulting in a compound motion of one or both surfaces.

BRIEF DESCRIPTION OF THE FIGURES

In order that the invention can be more clearly ascertained, examples of embodiments will now be described with reference to the accompanying drawings wherein:

FIG. 11 is a side cross-sectional view through an aircraft blade showing the blade in a typical inflight cruising condition.

FIG. 12 is a view similar to that shown in FIG. 11 and showing morphing of the blade profile using supporting structures and air leaking prevention sealing strips of embodiments of the invention.

FIG. 13 is a plan view of an arrangement showing multiple slotted wing flaps incorporating supporting structures of embodiments of the invention.

FIG. 14 is a side elevational view of the arrangement shown in FIG. 13 with the wing flaps in an unextended and unmorphed condition.

FIG. 15 is a view similar to that of FIG. 14 showing the multiple wing flaps in an extended condition and with the wing comprising a morphed profile.

FIG. 16 is a plan view of another arrangement showing use of a single supporting structure of the type previously described.

FIG. 17 is a side elevation diagrammatic cross-sectional view showing the arrangement of FIG. 16 applied to an aircraft wing and wing flap and where the wing flap is in an undeployed condition.

FIG. 18 is a view similar to FIG. 17 showing the flap in a deployed condition.

FIG. 19 is a part diagrammatic cross sectional view showing a three dimensional supporting structure and mountings therefor as would be envisaged in a typical embodiment.

FIG. 20 is a close-up detailed view at a first hinge connection between the first swing arm and the second swing arm to enable controlled movement of the first swing arm relative to the second swing arm in a uniform manner.

FIG. 23 shows a collapsed and extended supporting structure and multiple arm assemblies to permit extension of the second structure in a linear direction.

DESCRIPTION OF THE INVENTION

Figure 1:
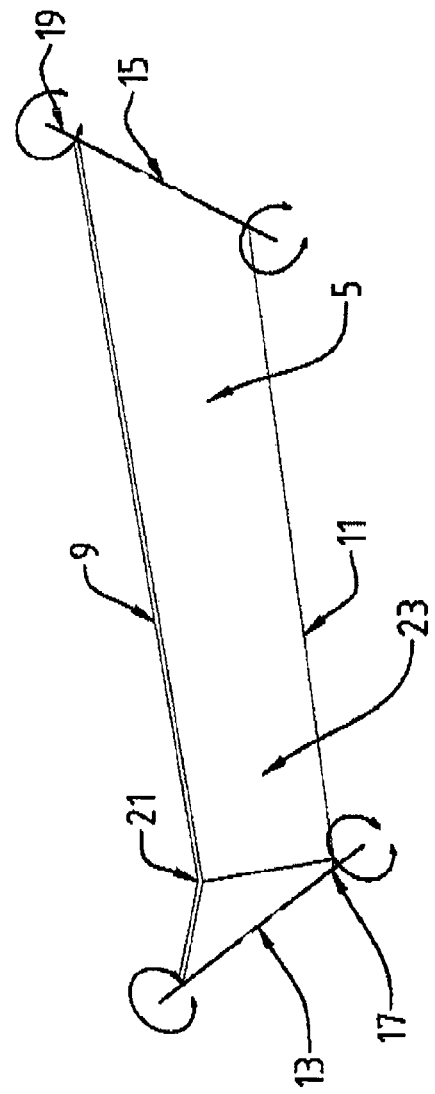
FIG. 1 is a perspective view of a first swing arm that form part of an arm assembly of a support structure.

Referring to FIGS. 1-6, there are shown components of a support structure 1 for connection between two surfaces required to be relatively supported and to have compound relative motion induced therebetween. The support structure is indicated generally by numeral 1 (shown in FIG. 3) and comprises an arm assembly 3. The components of the arm assembly 3 are shown in FIGS. 2-6. FIG. 1 shows curly a first swing arm 5, whereas FIGS. 2-6 show a first swing arm 5 and a second swing arm 7. In FIGS. 1-6, the first swing arm 5 and the second swing arm 7 are shown as sheet like members. This is in order to assist in understanding the particular angles of inclination involved for the swinging axes of the swing arms 5 and 7. As will be described throughout this specification and in particular in FIG. 19 and its description, swing arm 5 and the second swing arm 7 can have three dimensional arm like configurations and need not be sheet like.

FIG. 1 shows the first swing arm 5 with extending sides 9 and 11. These sides may extend parallel to one another or be inclined to one another. The first swing arm 5 has a first hinge connection 13 at one end, and a second hinge connection 15 at the opposite end. Accordingly, the first hinge connection 13 has a first hinge swing axis 17, and file second hinge connection 15 has a second swing axis 19. The first swing arm 5 can have an elbow bend 21. The first swing axis 17 of the first swing arm 5 can be inclined forwardly and outwardly from the top. The second swing axis 19 can be inclined relative or can be mutually perpendicular with the side 9.

Figure 2:
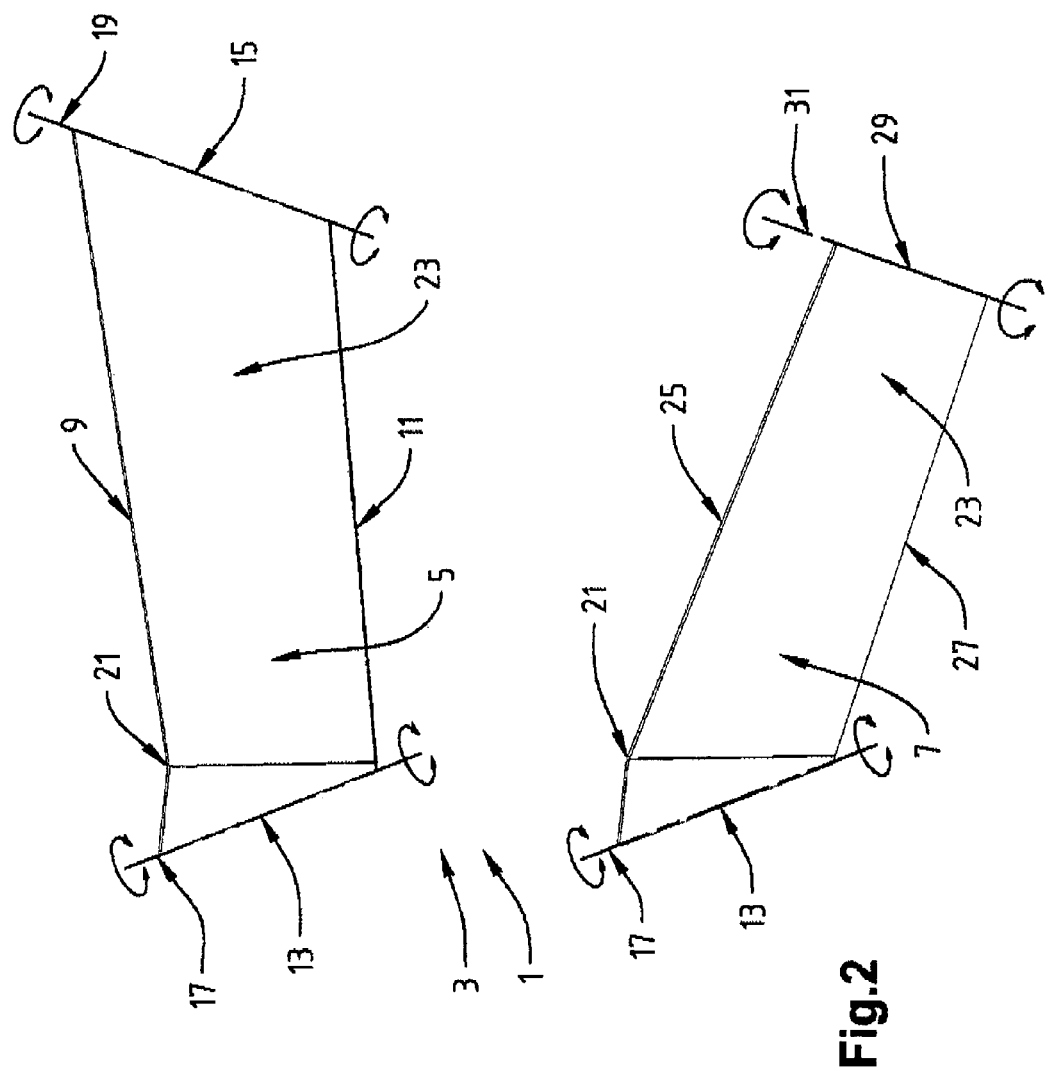
FIG. 2 shows a first swing arm (shown in FIG. 1) and a second swing arm in an unconnected relationship.

FIG. 2 describes the first swing arm 5, and a second swing arm 7 being almost a mirror image of the first swing arm 5. Accordingly, the second swing arm 7 has extending sides 25 and 27 and has a respective first hinge connection 13 and a third hinge connection 29. The second swing arm 7 therefore has a first swing axis 17 and a third swing axis 31.

FIGS. 3-6 show the first swing arm 5 and the second swing arm 7 connected together to form an arm assembly 3. The connection is a swingable connection at the first hinge connection 13 where each of the first swing axes 17 of the first swing arm 5 and the second swing arm 7 coincide. In other embodiments, the first swing axes 17 may be spaced apart but physically interconnected, for example on an intermediate linking arm. It should be noted, that the first swing axes 17 of each the first swing arm 5 and the second swing arm 7 are mutually parallel to one another, and that the angles of inclination of the second swing axis and third swing axis are aligned so that when there is swinging apart of the first swing arm 5 and second swing arm 7 there will be a common plane extending along the second hinge connection 15 and the third hinge connection 29. In other words, no matter the degree of swinging apart of the first swing arm 5 relative to the second swing arm 7, about the first hinge connection 13, an imaginary common plane can always be established with the hinge connections of the second hinge connection 15 and the fluid hinge connection 29.

Figure 3:
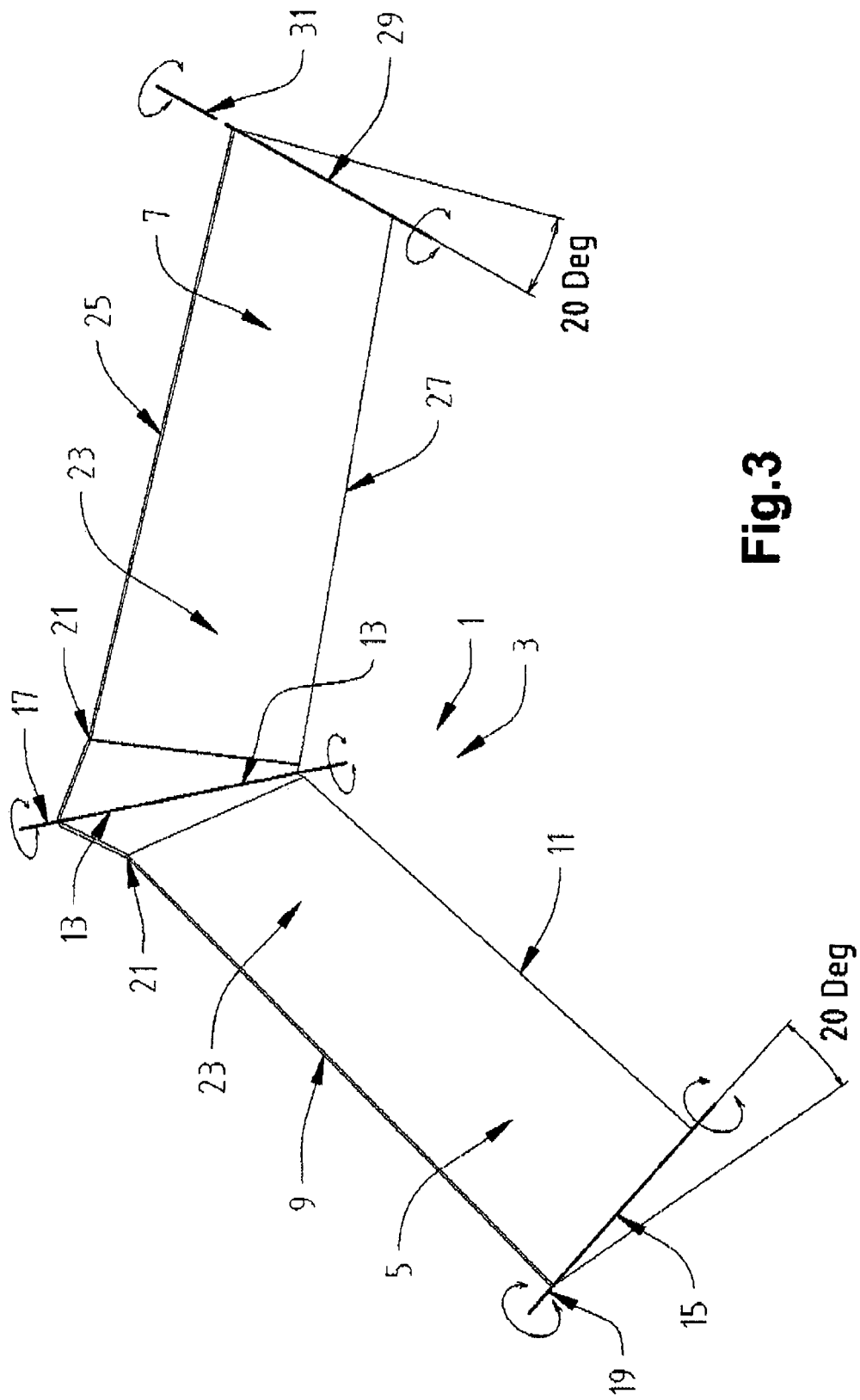
FIG. 3 is a plan view of the first swing arm and second swing arm when those two swing arms are flattened and lying in a common plane and interconnected with each other.

FIG. 3 describes the first swing arm 5 and the second swing arm 7 where main portions 23 of the arms are laid flat onto a common plane. The first swing arm 5 and second swing arm 7 have been inverted relative to that shown in FIGS. 1 and 2. This is shown by the angles of inclination of the respective elbow bends 21. The arm assembly 3 shown in FIG. 3 has been flipped such that the first swing axis 13 is upwardly inclined from the page from the point of intersection of the side 11 with side 27. Accordingly, with the main portions 23 of the first swing arm 5 and second swing arm 7 lying flat on a common plane, it can be seen Unit the angle of inclination from parallel extending axes lines 31 is approximately 20° inwardly and at a substantially minor image of each other. Thus angle may be zero or even negative (i.e. outwardly), however, the mirror image arrangement will still be present. Accordingly, if the arm assembly 3 were to be lifted by moving the first swing axes 13 upwardly whilst maintaining the second swing axis 19 and third swing axis 31 on an imaginary common plane that intersects with the second swing axis and the third swing axis, then the second hinge connection 15 and third hinge connection 29 would draw close to each other and remain on a common plane.

Figure 4:
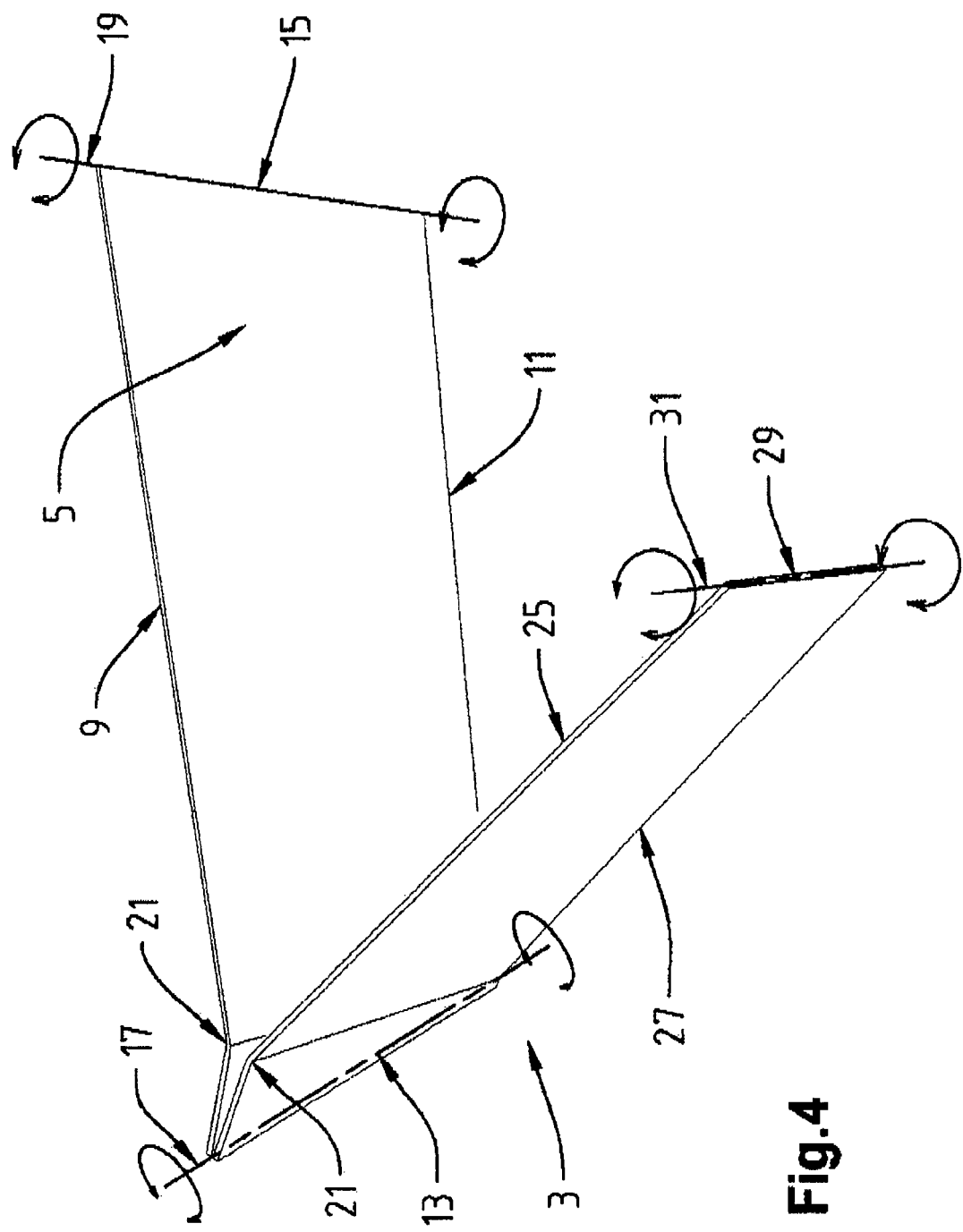
FIG. 4 is a perspective view of the first swing arm and second swing arm when connected together and in a partly closed condition.
Figure 5:
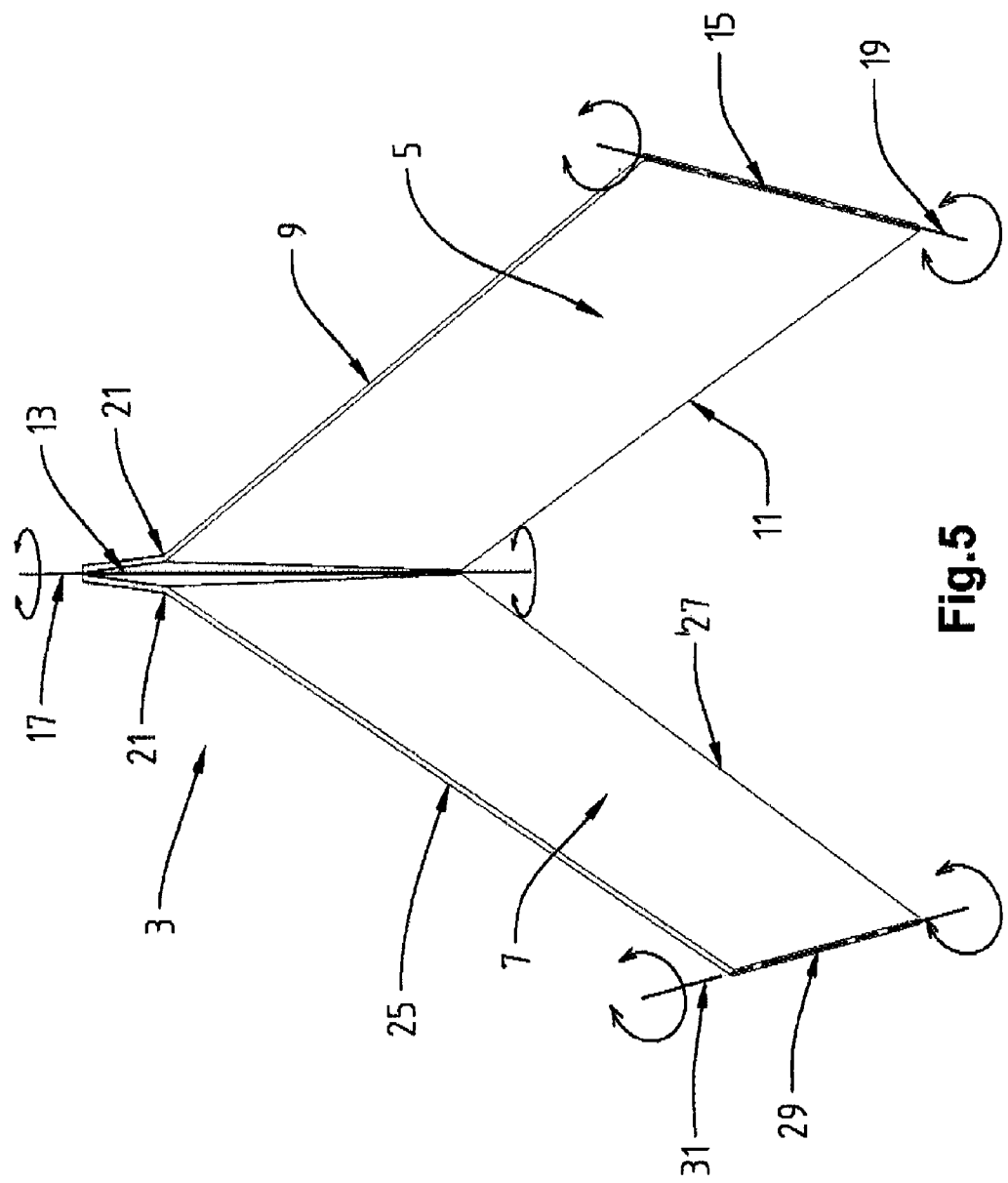
FIG. 5 is a view similar to FIG. 4 showing the first swing arm and second swing arm in a partly closed position and when viewing in a different angle to that shown in FIG. 4.

FIG. 4 describes top perspective view of the first swing arm 5 and the second swing arm 7 interconnected at the first hinge connection 13. FIG. 5 is a top perspective view of the arrangement shown in FIG. 4 (but taken from a different angle).

Figure 6:
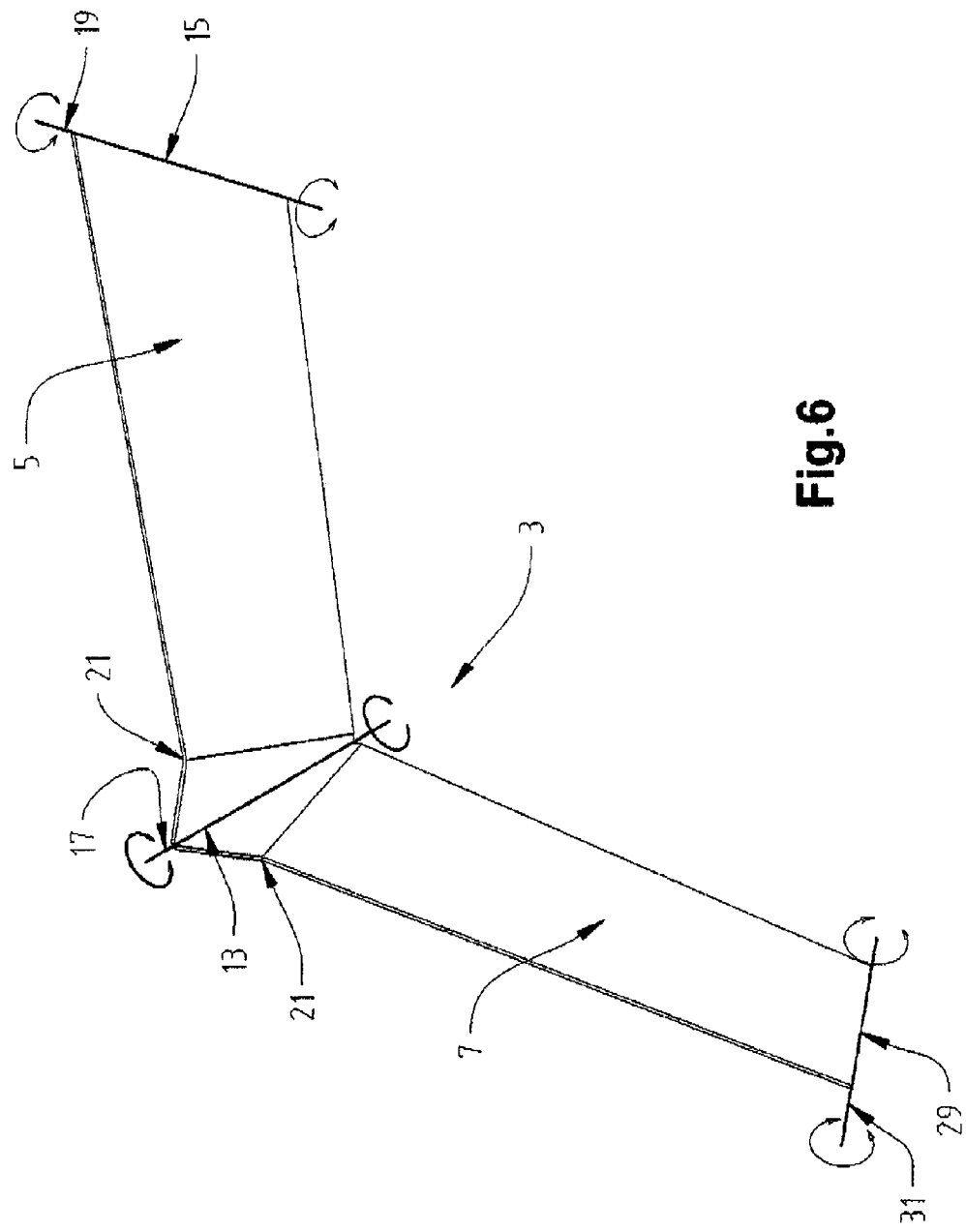
FIG. 6 is a view similar to FIG. 5 but showing the first swing arm and second swing arm in a position more fully open than shown in FIG. 5.

FIG. 6 is a view similar to that of FIG. 5 but showing the first swing arm 5 and second swing arm 7 in a move open position man shown in FIGS. 4 and 5.

In FIGS. 4-6, the arm assembly 3 has the first hinge connection 13, second hinge connection 15, and third hinge connection 29 with their respective swing axes inclined. Thus, when the arm assembly 3 is moved so that the first swing arm 5 and second swing arm 7 move relative to one another (when the first swing arm 5 and second swing arm 7 are opened and closed) there will be compound relative motion between the first hinge connection 13 and second hinge connection 15. In other words, in this embodiment the third swing axis is inclined in a mirror image arrangement to the second swing axis, and at a compound angle with respect to a swing axis of the first hinge connection.

In FIGS. 4-6, the elbows 21 in the suing arms 5 and 7 can assist in the relative cranking of the arms during opening and closing. The elbows also contribute to the degree of compound movement imparted to the two surfaces.

Figure 7:
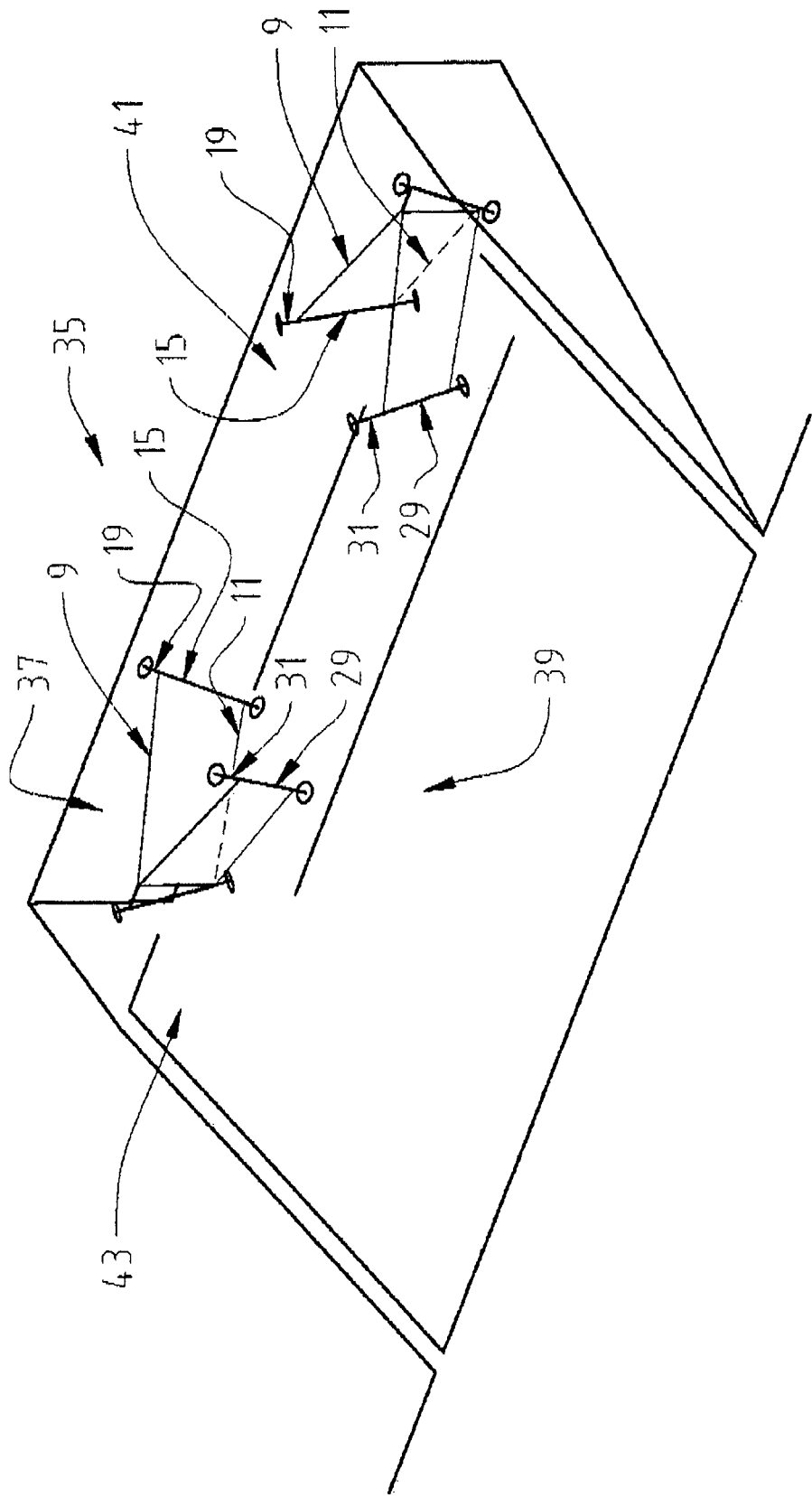
FIG. 7 is a diagrammatic view showing an aircraft wing with an aircraft flap supported by use of two support structures as shown in the examples of FIGS. 3-6
Figure 8:
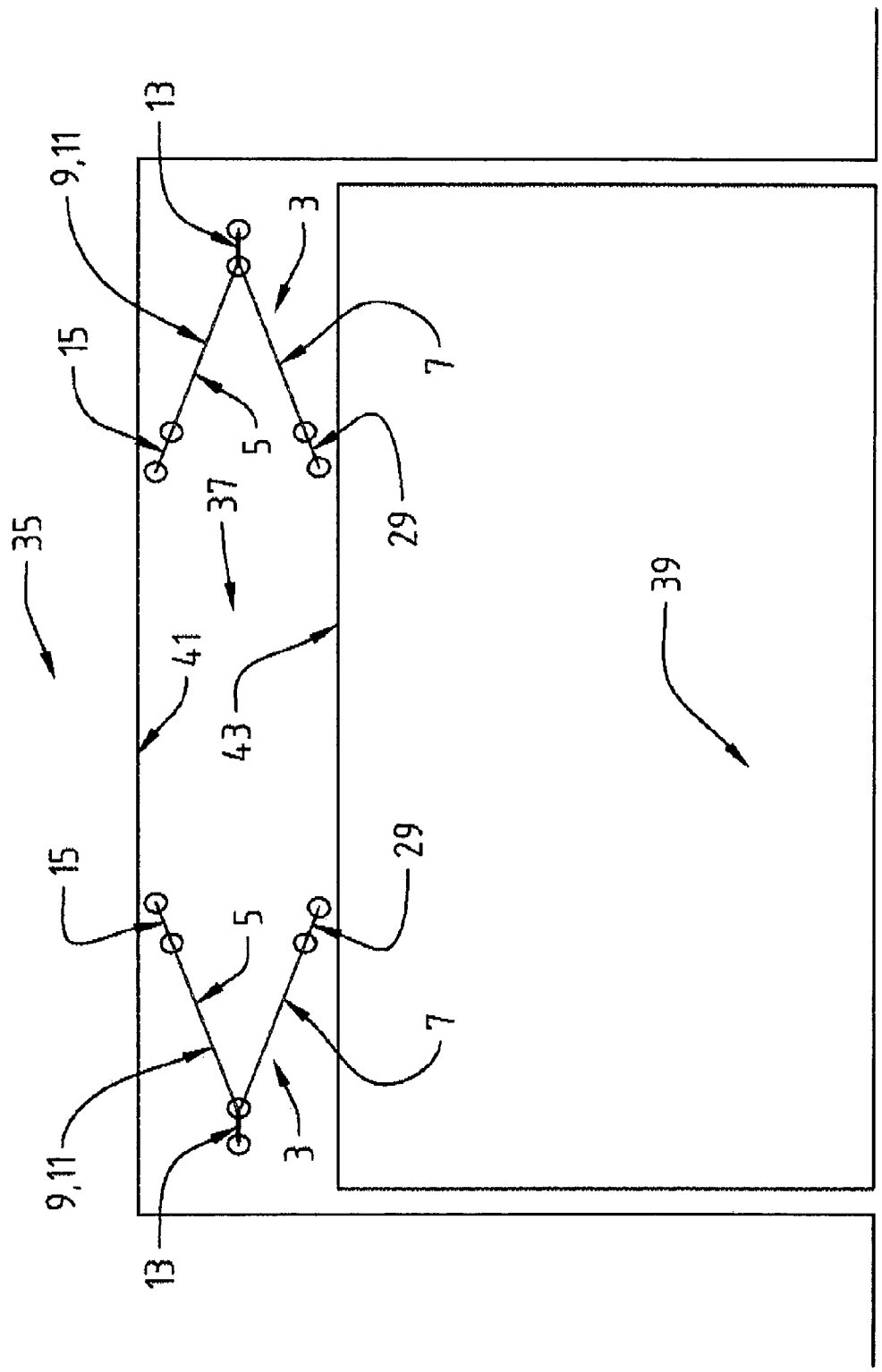
FIG. 8 is a plan view of the arrangement shown in FIG. 7
Figure 9:
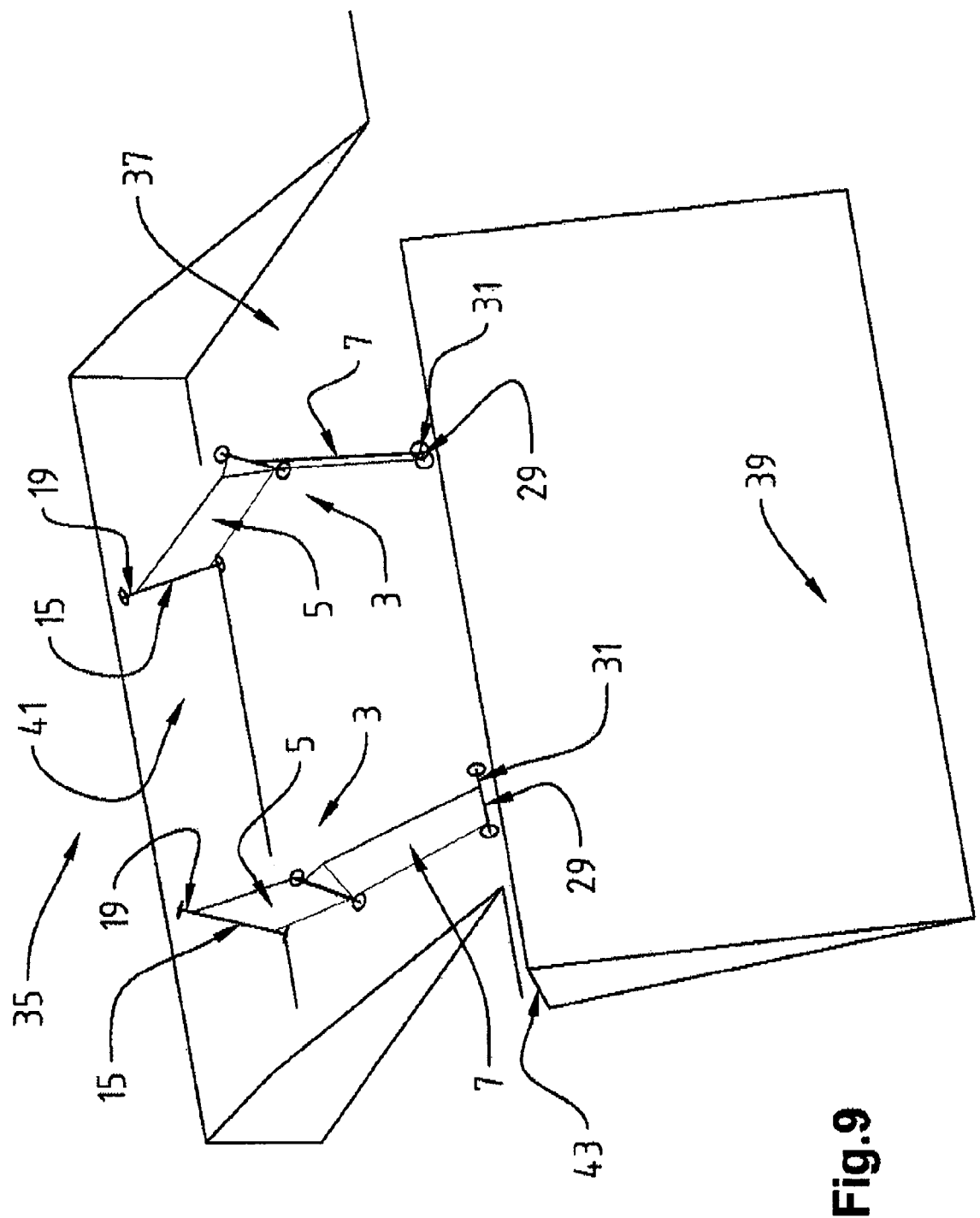
FIG. 9 is a perspective view similar to that of FIG. 7 but showing deployment of the wing flap.

FIGS. 7-9 describes an arrangement for connection between two surfaces required to be relatively supported and to have compound relative motion induced therebetween. In these figures, an aircraft wing and an aircraft wing flap are shown as the respective two surfaces. In FIG. 7, an aircraft wing 35 has a cut-out 37 to receive a wing flap 39. At the inside edge of the cut-out 37 there is provided an upright face 41. The inside face of the wing flap 39 also includes an upright face 43.

In FIG. 8, a pair of arm assemblies 3 (of the type shown m FIGS. 1-6) are interconnected with the respective upright faces 41 and 43 so that the second hinge connections 15 are connected with the upright face 41, and so the third hinge connections 29 are connected with the upright face 43. In this example, the arrangement is such that the first hinge connections 13 of both arm assemblies 3 are furthest away from one another, and the second hinge connections 15 and third hinge connections 29 are closest to one another. The arrangement may be transposed so that the first hinge connections 13 are closest to one another and the second hinge connection 15 and third hinge connection 29 furthest away from one another.

In the embodiments of FIGS. 7-9 the second swing axis 19 and third swing axis 31 are inclined in a three dimensional offset relative to the upright faces 41 and 43. In other words, they do not connect directly onto the upright faces 41 and 43 but connect via mounting supports to have the inclined angled relationships depicted. The mounting supports will be referred to hereinafter. The arrangement is such that the two arm assemblies 3 provide a supporting structure between two surfaces required to be relatively supported and to have compound relative motion induced therebetween. The wing flap 39 is supported relative to the Wing 35 for compound motion.

FIG. 8 shows the arrangement where the first swing arm 5 and second swing arm 7 are in a substantially closed position so that the flap 39 is within the cut-out 37. FIG. 9 shows the arrangement where the first swing arm 5 and second swing arm 7 Ale relatively opened and the wing flap 39 deployed from the cutout 37 in the wing 35 and extending outwardly and downwardly. The wing flap 39 will have moved from a positron where its surfaces are generally coplanas with the surfaces of the wing 35 to a position where the wing flap 39 extends deployed outwardly and downwardly. The wing flap 39 will have therefore moved in a compound motion when it extends from the retracted position to the extended position. The wing flap 39 may be extended by applying a force either directly to the wing flap 39 to push it outwardly form the upright face 41. Alternatively, a force may be applied to either the first swing arm 5 or the second swing arm 7. In one example, a swinging force may be applied to the respective first swing arms 5 from a drive means held within the interior of the wing 35. Another example is described in FIG. 16. In another example, a push rod may extend from the wing 35 and connect directly with the wing flap 39 so that when the push rod is extended and retracted the wing flap 39 can be correspondingly extended and retracted. The support structure 1 comprising the two arm assemblies will cause the wing flap 39 to extend outwardly and downwardly with a compound movement.

The embodiment shown in FIG. 7-9, the height profile of the swing arms 5 and 7 are within the height profile of the wing 35 and do not protrude downwardly or above the profile of the wing 35 when the wing flap 39 is in the retracted position shown in FIG. 8. Thus, failings are no longer required.

The sides 9 and 11 of the first swing arm 5 may not be parallel to one another. This will then provide a large cross sectional area to the first swing arm 5 where it connects with the wing 35. This, in turn, means that the first swing arm 5 will have its greatest strength closest to the upright face 41 of the wing and that there can be a taper in height of the first swing arm 5 through to the end of the second swing arm 7 at the third hinge connection 29 where it connects with the upright face 43 at the wing flap 39. The proposal allows for a reduction in the thickness of the material of the swing arms 5 and 7 and consequently provides some cost and weight savings benefits. It is not essential to provide a taper of this type.

Figure 10:
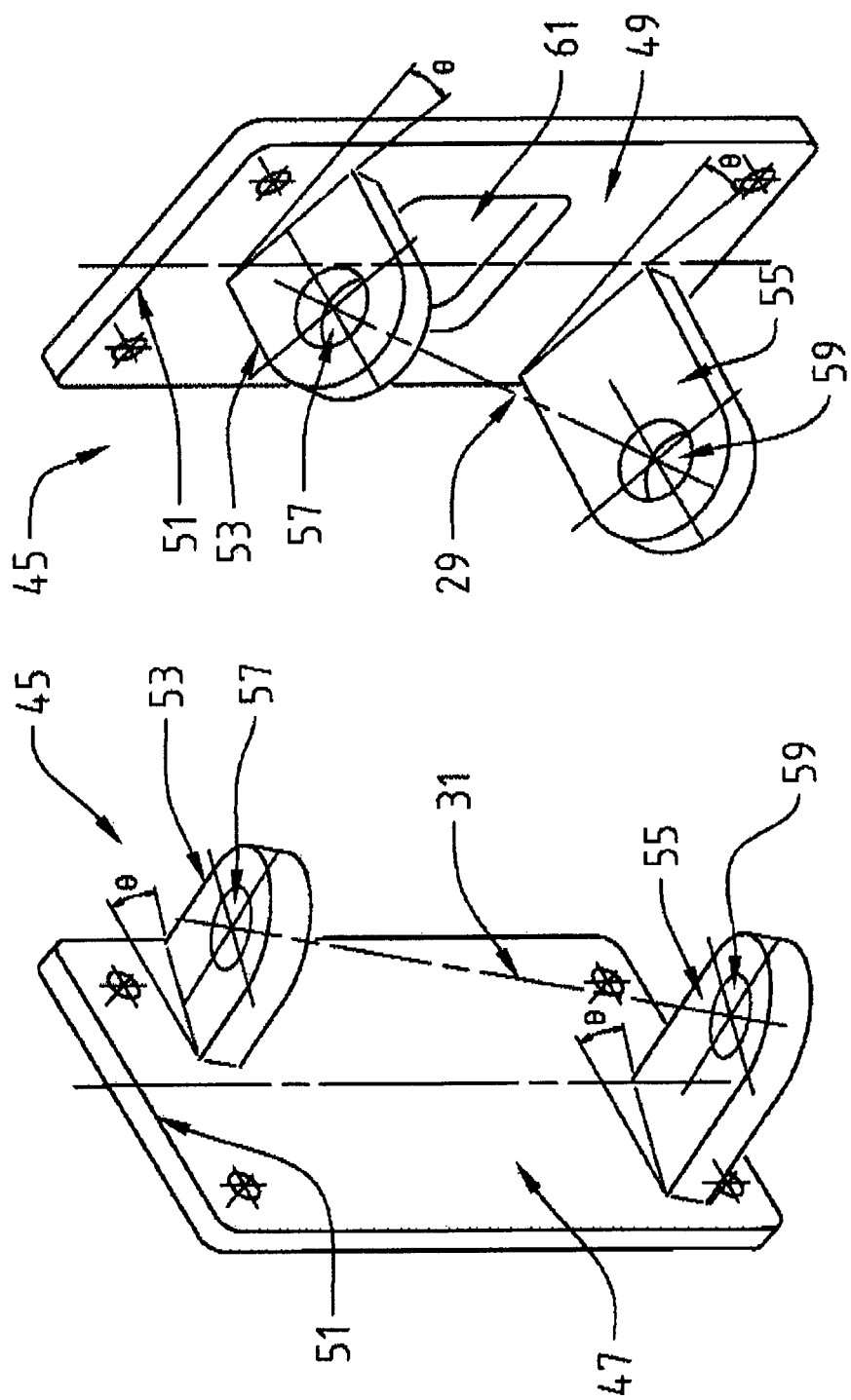
FIG. 10 is a view showing mounting supports that connect with the aircraft wing and the wing flap and provide swinging axes for the first swing arm and second swing arm of the supporting structure.

Referring now to FIG. 10, there is shown two mounting supports 45 to permit the first swing arm 5 and the second swing arm 7 of one of the arm assemblies 3 to be mounted respectively to the upright faces 41 and 43 of the wing 35 and the wing flap 39 so that the second hinge connection 15 and third hinge connection 29 can have their respective swing axis mounted with the inclined relationship. The arrangement is duplicated for the other arm assembly. FIG. 10 shows a mounting support 47 for connection with the wing flap 39, and a mounting support 49 for connecting with the wing 35. In each case, there is a mounting plate 51 with two mounting flanges 53 and 55. Mounting flanges 53 have openings 57 therein, and mounting flanges 55 have openings 59 therein. Openings 57 will therefore be positioned closer to the face of the mounting plate 51 than openings 59 because of the length differential in the flanges 53 and 55. The openings 57 and 59 receive pivot pins which interconnect with the respective first swing arms 5 and second swing arms 7 at the second hinge connection 15 and third hinge connection 29 respectively. Thus, it can be seen that because the flanges 53 and 55 are mounted in an inclined relationship to the horizontal represented by angle θ, and because the vertical offset of flange 53 with respect to flange 55 and because the spacing of the openings 57 and 59 along the lengths of the respective flanges 53 and 55 is different, the second swing axis 19 and third swing axis 31 will have a compound angular orientation. With the arrangement shown, a wing flap 39 will extend outwardly and downwardly with a compound motion and will retract in a similar reverse manner.

In other embodiments, the angles of inclination of the second swing axis 19 and third swing axis 31 may be inclined differently to the angle described above. This was mentioned previously, for example in FIGS. 1-9, where the axis were mentioned being mutually perpendicular to the side edges 9 and 11 of the first swing arm 5 and second swing arm 7 or may even be negatively or positively inclined relative that shown in the previous examples. If negatively inclined, then the wing flap 39 will swing downwardly by a different degree. If the angle of inclination is at zero inclination i.e. perpendicular to the side edges 9 and 11 (or the central longitudinal axis of each of the swing arms 5 and 7), then the wing flap 39 will extend directly outwardly and downwardly. This of course also assumes that the first swing axis 17 is inclined in the required relationship to permit the swinging downwardly as the wing flap is extended. Accordingly, the angle of inclination of the first swing axis 17 may be inclined at different angular orientations as well.

In a variation, the second swing axis 19 and the third swing axis 31 may be positively or negatively inclined relative to one another (but with a mirror image angular inclination), and So the first swing axis 17 is mutually perpendicular to the sides 9 and 11, and 25 and 27. In other words, the first swing axis 17 will be mutually perpendicular to central longitudinal axes of each of the first swing arm 5 and second swing arms 7. In this arrangement the upright faces 41 and 43 will be moved apart in a compound motion but the degree of downward displacement will be relatively less than in the case of the embodiment in FIGS. 7 to 9.

Mounting flange 51 has a central opening 61 to permit application of a motion inducing force from a lever to be applied to the structure 1 to cause the necessary swinging of the arms 5 and 7, and the extension and or retracting of the wing flap 39 relative to wing 35.

Referring now to FIGS. 11 and 12 there are shown cross-sectional views of a blade like member which may, in fact, be a helicopter, wind, turbine or other type of blade. The concept disclosed in these figures is applicable generally to any article and should not be limited to helicopter blade or wind turbine blades or similar blades. FIG. 11 shows an arrangement with a main blade body 63 and with a trailing edge flap 65 and a leading edge flap 67. The main body 63 is typically hollow and includes an actuator shaft 69 for deployment and retraction of the respective trailing edge flap 65 and leading edge flap 67. The surface profiles of the upper surface and lower surface of the main body 63 can have an arrangement of the type as shown. Here, there is an overlying surface 71 and a further overlying surface 73 at the trailing edge of the blade, and an overlying surface 75 and a further overlying surface 77 at the leading edge of the blade. The trailing edge flap 65 is supported by one or more arm assemblies 3 in a manner previously described and the leading flap 67 is supported in a similar manner by one or more arm assemblies 3, also in a manner previously described. The leading edge and trailing edge overlaying surface 71, 73, 75 and 77 with sealing strips at the tips overlap underlying surfaces 79 to provide a surface for sealing strips to prevent an leakage between blade surfaces. Lever arms 80 are operatively connected with the actuator shaft 69, typically via a screw threaded arrangement such that rotation of the actuator shaft 69 causes the lever arms 80 to traverse along the length of the actuator shaft 69 in direction dependent on the direction of rotation which, in turn, will then cause a swinging motion to be imparted through the lever arms 80 to cause opening and/or closing of the arm assemblies 3. In FIG. 1D, the opening 61 is provided to allow a similar level arm 80 to pass therethrough to engage with the respective swing arm of the arm assembly 3 to effect such swinging motion.

FIG. 12 shows the arrangement where the arm assemblies 3 have been fully opened and that the overlying surfaces 71, 73, 75 and 79 provide substantially contiguous upper surfaces to the blade, even when in the extended condition. This enhances aerodynamic characteristics of the blade. Whilst a single actuator shaft 69 has been provided, there may be independent actuator shafts for each of the trailing edge flap 65 and leading edge slat 67. In addition, other forms of actuation may be utilised. The actuator shaft 69 may be rotated by an electrical or hydraulic motor or other means from a position at the most radially innermost part of the blade (i.e. at the centre of rotation of the blade). It should be appreciated that the arrangement depicted in FIGS. 11 and 12 provides a supporting structure to change the wing profile of blades whilst in use. Further ways of inducing movement of the arm assemblies 3 to morph the shape of the blade include use of cams carried by the actuator shaft 69 or by use of a ball screw carriage that travels along the length of the actuator shaft 69. Other ways are not excluded. In each of FIGS. 11 and 12 it can be seen that the height profile of the arm assemblies 3 are within the height profile of the main aerofoil when the trailing edge flap 65 and the leading edge flap 67 are in the closed withdrawn conditions as depicted in FIG. 11. Further, by observing FIG. 12, it can be seen that the height profile of the arm assemblies 3 is also within the total height profile of the morphed aerofoil so formed.

FIGS. 13-15 describe a plan and two cross-sectional views depicting an aerofoil wing comprising multiple slotted flaps 81. The arrangement are similar to those shown in FIGS. 7-9. The innermost arm assembly 3 has a larger height profile than the outermost arm assembly 3. In each case however, the respective arm assemblies 3 are within the relevant height profile portion of the aerofoil when the flaps 81 are in the retracted position. FIG. 13 shows actuator lever shafts 83 that can be rotatable threaded shafts with gimbal joints to allow for a change of direction of compound movement imparted between the innermost flap 81 and the outermost flap 81. The actuator lever shafts 83 may be rotated by suitable drive means as would be evident to persons skilled in this art.

FIGS. 16-18 illustrate, using a plan and two cross-sectional views, an arrangement of an aeroplane wing 35 with one or more wing flaps 85. In this case, each flap 85 is supported by only a single arm assembly 3 of the type previously described. A threaded actuator lever 87 is provided on each side of the arm assembly 3. A drive means 89 such as electric or hydraulic motors can be associated with the actuator level 87 and be positioned in the space between the wing 35 and the wing flap 85 as shown. Accordingly, operation of the drive means 89 will cause the actuating level 87 to be relatively extended (as shown in FIG. 18) and provided both motors are operated in unison, there will be controlled movement of the wing flap 85 from the wing 35 to change the profile of the wing. Other forms of drive means can be included and are not excluded. In this embodiment, it can be seen that the actuating lever 87 is mounted for swinging movement about a swingable coupling 91 to allow far the appropriate angular defection of the wing flap 85 when the wing flap 85 is extended or retracted.

FIG. 19 is an engineering drawing configuration of the arm assembly 3 for use in any one of the embodiments previously disclosed. The arm assembly 3 comprises tubular circular shaped first swing arm 5 and second swing arm 7. The first hinge connection 13 has the respective first swing axes 17 aligned together and coupled by a coupling pin 93. Mounting supports 45 comprising mounting supports 47 and 49 as depicted in FIG. 10 are connected respectively to the wing 35 and the wing flap 39. Accordingly, the second swing axis 19 and third swing axis 31 have angles of inclination that will be provided by the respective mounting supports 47 and 49 as depicted in FIG. 10. FIG. 19 shows an actuating lever 87 that is a screw thread lever that couples with a carriage 95 to traverse backwards and forwardly along the actuator lever 87. The carriage 95 in turn, carries a lever 97 that has a yoke part 99 to pursuit swivel connection via connection pin 101. The lever 97 straddles across an axle 103 which, in turn, provides a swing axle for the first swing arm 5 relative to the mounting support 45. The lever 97 passes through the opening 61 previously described. Thus, as the carriage 95 traverses along the threaded actuator lever 87, it will cause swinging of the axle 103 which will, in turn, impart a swinging motion to the first swing arm 5. There will then be swinging of the arm assembly 3 such that there can be deployment and retraction of the wing flap 39 in a way previously described.

FIG. 20 illustrates in detail a mechanism at the first swing axis 17 between the first swing arm 5 and second swing arm 7 to ensure that when there is a movement of the first swing arm, there will be a corresponding movement of the second swing arm 7 in either an outwardly or inwardly swinging direction in a mirror image displacement relative to the first swing arm and its swinging. Here it can be seen that the first swing arm 5 has arm extensions 105 and that the second swing arm 7 has arm extensions 107 that fit between the arm extensions 105. The first swing arm 5 and second swung arm 7 are coupled to each other by sleeve bearings 109. The sleeve bearings 109, in turn, carry two spaced apart bevel gears 111 that are rotatably connected therewith. Bevel gears 111 are supported on axles 113 for rotation thereabout. The first swing arm 5 carries bevel gears 115 that respectively locate on diametrically opposite sides of the respective bevel gears 111. In this case, the lowermost bevel gears 115 shown in FIG. 20 are connected with the second swing arm 7 and the upper bevel gears 115 connected directly with the first swing arm 5. Accordingly, when there is swinging motion of the first swing arm 5, there will be relative rotation of the bevel gears 115 relative to the free wheeling bevel gears 111. The bevel gears 111 will then, in turn, rotate about the axles 113 and impart drive to the bevel gears 115 to cause the second swing arm 7 to swing open and/or closed relative to swing arm 5.

The above arrangement may be incorporated with the arm assemblies 3 of any of the previously described embodiments to ensure there is equal swinging path displacement of the first swing arms 5 and the second swing arm 7.

Figure 21:
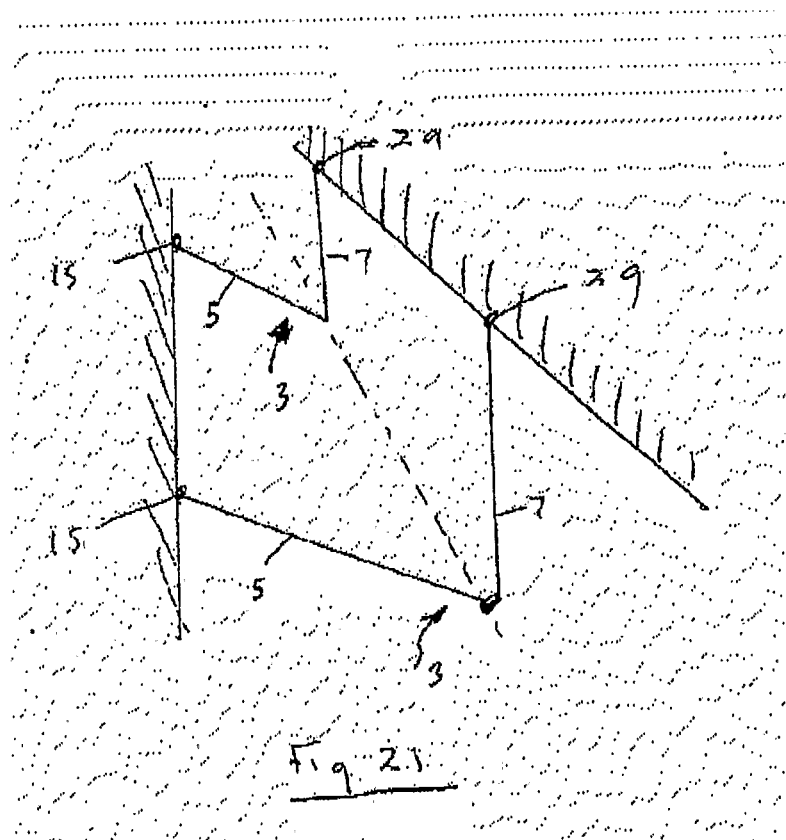
FIG. 21 is a diagrammatic view showing an arrangement of two arm assemblies that form the supporting structure where each of the arm assemblies have different lengths to each other.

FIG. 21 describes an embodiment where two arm assemblies 3 are connected with respective surfaces where support is required of one surface relative to the other surface, and an induced compound swinging motion is to be applied between the two surfaces. The length of the first swing arms 5 and second swing arms 7 in the uppermost arm assembly 3 shown are relatively shorter than the corresponding length of the first swing arms 5 and the second swing arms 7 in the lowermost depicted arm assembly 3. In this arrangement, the two surfaces will swing apart and undergo a compound angular movement. The swinging apart will progress at different rates for the respective arm assemblies 3. An arrangement of this type may be suitable for use when the support structure is utilised for a door or similar closure. In some instances, it may have particular application in Vehicles that require gull-wing type doors where the door lifts as well as opening. Accordingly, one of the surfaces may represent the vehicle body and the portion of the vehicle body that surrounds the door opening whilst the other surface may represent the actual door.

Figure 22:
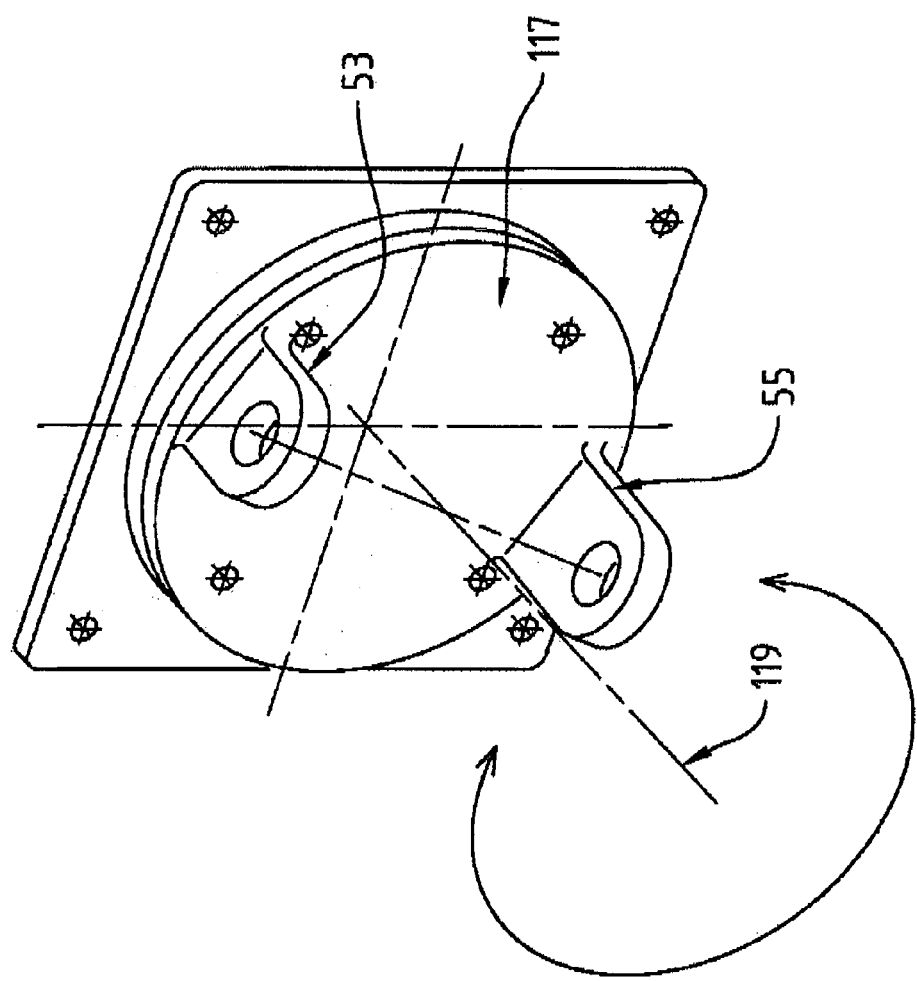
FIG. 22 shows an alternative monitoring support to that shown in FIG. 10.

FIG. 22 shows an alternative mounting support 45 to mat shown in FIG. 10. In this arrangement, the concept is the same as in FIG. 10 so the concept of the offset arrangement of the mounting flanges 53 and 55 is utilised but here, the mounting flanges 53 and 55 are mounted to a rotatable plate 117 that can rotate about a central axis 119. Accordingly, as the arm assembly 3 is moved under the influence of a motion inducing force to open and close the arm assembly 3, there can be angular rotation about central axis 119 to facilitate an intended movement of the first surface relative to the second surface. This is particularly useful in aircraft swept wing arrangements. Thus, if an aircraft requires the flap to extend parallel to a central lengthwise axis of an aircraft, then it should be appreciated that the respective second and third swing axes have different deployment axes which are positioned at different locations. Thus in turn, requires that there must be swivel connections where required. Accordingly, the arrangement in FIG. 22 allows for this operation.

FIG. 23, describes eight arm assemblies 3, an induced compound swinging motion of the assemblies where there is required to be support to impart a lifting force an the respective surfaces in a lineal direction. In this case, the first hinge connection is negatively inclined relative to that shown in previous examples. It should be noted that swing arms 5 and 7 with a negative inclination at the first swing axis 17 the surfaces will move apart on the same lineal axis. Arrangement of this type may be suitable for a lifting structure and in some instances may be connected on top of each other as modules. In some instances these modularized assemblies for roof lifting jacks, space deployment structures such as solar array panels and temporary or permanent structures such as lighting. Forces can be applied to only one module with linkages transferring the force to the other modules for combined lifting and extension or on all or partial modules.

Figure 24:
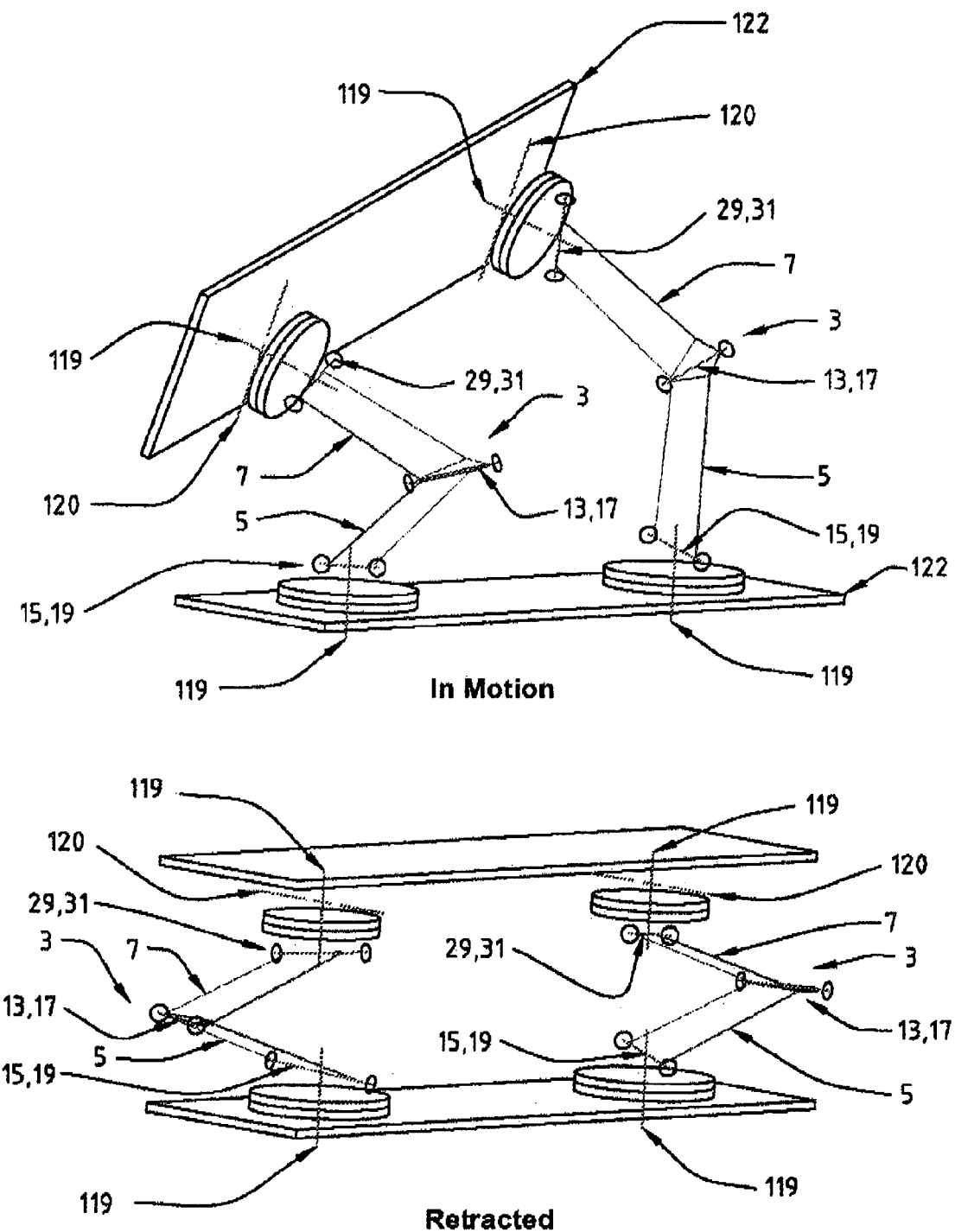
FIG. 24 shows a synergistic motion platform providing six degrees of freedom (x, y, z, pitch, roll and yaw).

Referring now to the embodiment shown in FIG. 24 it can be seen that there are two arm assemblies 3. The rotatable arm assemblies connected with respective surfaces 121 and 122 impart a synergistic induced compound swinging motion applied between the two surfaces providing six degrees of freedom to position the platform 121 in the attitude required. In the case the arms assemblies swivel about axis 119 and may undergo a compound angular movement. Accordingly, the arrangement in FIG. 22 allows for rotation. The swing apart and rotation will progress at rates to attain the attitude required. In this case axis 120 allows the platform to rotate to suit the attitude required. An arrangement of this type may be suitable for aircraft simulators, solar arrays, robotics and similar applications Platform 121 may be positioned by applying a force to the first hinge connection 13 on each arm assembly 3 and the central axis 119 at different rates to attain platform 121 attitude requirement or continuous motion.

In all embodiments herein the structure is such that is easy to manufacture, install and maintain relative to known structures. This is because there are few components required than in known structures.

Throughout this specification, the term "aerofoil" has been used with particular application for use as an aerodynamic aerofoil. It should be appreciated however, that the concept disclosed herein may be suitable for a hydrofoil. Thus, the term "aerofoil" should be considered throughout the specification and claims to embrace "hydrofoil" and should not be construed as limiting solely to aerofoils. It should also be appreciated that the concept disclosed herein may be utilised in aircraft to control any of the control surfaces and high lift devices such as wing flaps, ailerons, leading edge slats such as Krueger slats. The invention is therefore applicable to flaps, slats, flaperons, blades, blades such as helicopter blades, blades of windpower turbines, blades of fixed wing sailboats and the like. The invention also has application for use with ship stabilisers, wing keels, submarine fins and stabilisers, torpedo tins and stabilisers, and the like.

It should be appreciated that the degree of deflection for morphing of an aerofoil can be controlled by the respective angles of the first swing axis 17, second swing axis 19, and third swing axis 31. In addition, the length of the respective first swing arm 5 and second swing arm 7 can be adjusted to provide for further variations in deployment configurations.

It should therefore be appreciated that many modifications may be made to the invention and the embodiments described above without departing from the ambit of the invention.

In one such case the supporting structure may be used as a retro-fit to existing aircraft to replace the wing flap or other flap supporting structures thereby enabling removal of the known fairings.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An aerofoil comprising a main aerofoil and an auxiliary aerofoil and where said auxiliary aerofoil can be extended and retracted relative to said main aerofoil to change aerodynamic characteristics of the aerofoil;
   a compound motion inducing and supporting structure connected between the main aerofoil and the auxiliary aerofoil to permit support and extension and retraction therebetween;
   said structure comprising at least two arm assemblies each assembly comprising a first swing arm and a second swing arm, said first swing arm and said second swing arm being swingingly connected with each other at respective one ends by a first hinge connection located therebetween; and
   wherein a second hinge connection is provided at the opposite end of said first swing arm and connected with said main aerofoil, and wherein a third hinge connection is provided at the opposite end of said second swing arm and connected with said auxiliary aerofoil;
   wherein swing axes of the second hinge connection and third hinge connection are inclined relative to the first hinge connection;
   each of at least two arm assemblies being mounted to the respective main aerofoil and auxiliary aerofoil in spaced apart relationship;
   said first swing arm and said second swing arm being mounted to permit swinging about all swing axes and a compound motion to be imparted to the auxiliary aerofoil to cause swing movement of the arms to an extended or retracted condition, and so the swing axis of the second hinge connection and the third hinge connection of each arm assembly trace a path where there will be a respective common plane intersecting therewith at all swing movement positions;
   wherein in the retracted condition said structure is contained within the profile of the aerofoil; and
   wherein the aerofoil further comprises respective mechanisms operatively connected to the first arms at or adjacent the first hinge connections to constrain the first arms and the second arms to swing about the respective first hinge connections with mirror image displacements relative to each other during swinging between retracted and extended swing conditions.

2. An aerofoil as claimed in claim 1, wherein said mechanisms comprise gear mechanisms.

3. An aerofoil as claimed in claim 1, wherein said mechanisms comprise screw mechanisms.

4. An aerofoil as claimed in claim 1, wherein said first hinge connection comprises a hinge member comprising a first side edge and a second side edge, and wherein said first swing arm connects to said first side edge and said second swing arm connects to said second side edge by respective hinge connections, whereby said first hinge connections has two hinge axes defined by said respective hinge connections.

5. An aerofoil as claimed in claim 1, wherein said third hinge connection is carried on a structure which is independently swingably connected with said auxiliary aerofoil to swing about an axis that extends perpendicular to the swing axis of the third hinge connection.

6. An aerofoil as claimed in claim 1, wherein two adjacent arm assemblies constitute a pair of arm assemblies and wherein the first swing hinge connections of the pair are disposed furthest away from one another; and said second swing hinge connections and said third swing hinge connection are disposed closest to one another.

* * * * *